US009702562B2

(12) United States Patent
Plante et al.

(10) Patent No.: US 9,702,562 B2
(45) Date of Patent: Jul. 11, 2017

(54) COMBUSTION SYSTEMS AND COMBUSTION SYSTEM COMPONENTS FOR ROTARY RAMJET ENGINES

(75) Inventors: Jean-Sebastien Plante, Sherbrooke (CA); Mathieu Picard, St-Jean-sur-Richelieu (CA); David Rancourt, Grand-Mere (CA)

(73) Assignee: SOCPRA SCIENCES ET GENIE, S.E.C. (CA)

( * ) Notice: Subject to any disclaimer, the term of this patent is extended or adjusted under 35 U.S.C. 154(b) by 739 days.

(21) Appl. No.: 14/126,782

(22) PCT Filed: May 25, 2012

(86) PCT No.: PCT/CA2012/000502
§ 371 (c)(1),
(2), (4) Date: Mar. 8, 2014

(87) PCT Pub. No.: WO2012/171094
PCT Pub. Date: Dec. 20, 2012

(65) Prior Publication Data
US 2014/0290259 A1    Oct. 2, 2014

Related U.S. Application Data

(60) Provisional application No. 61/497,569, filed on Jun. 16, 2011.

(51) Int. Cl.
*F23R 3/28* (2006.01)
*F23R 3/18* (2006.01)
(Continued)

(52) U.S. Cl.
CPC ............... *F23R 3/28* (2013.01); *F02C 3/165* (2013.01); *F02C 7/264* (2013.01); *F02K 7/10* (2013.01);
(Continued)

(58) Field of Classification Search
CPC .... F23R 3/28; F23R 3/18; F23R 3/286; F02C 3/165; F02C 7/264; F02K 7/10
(Continued)

(56) References Cited

U.S. PATENT DOCUMENTS 1,387,166 A * 8/1921 Pazos-Martinez ........ F02C 5/12
123/152
1,388,707 A * 8/1921 Heinze ...................... F02C 7/00
60/39.11
(Continued)

FOREIGN PATENT DOCUMENTS

CN    101705883 A    5/2010
TW       417007 B    1/2001
(Continued)

OTHER PUBLICATIONS

International Search Report for PCT/CA2012/000502, Completed by the Canadian Patent Office on Aug. 6, 2012, 4 Pages.
(Continued)

*Primary Examiner* — Robert J Hicks
(74) *Attorney, Agent, or Firm* — Norton Rose Fulbright Canada LLP

(57) ABSTRACT

A combustion systems and components for rotary ramjet engines. An injection system, optionally stratified for ease of engine startup, provides an air and fuel mixture to a combustion chamber. An ignition system ignites the mixture. A flameholding system may be positioned for communication with the combustion chamber to force an ignited flow of the air and fuel mixture toward a center of rotation within the ramjet engine. The ramjet engine may have a diverging stator for improved exhaust efficiency. The ignition may take place in the engine air intake. Alternatively, the ignition may take place within the combustion chamber using a dual-hub electrically charged system. An impulse turbine may use recirculation of injected fuel to cool a rim-rotor and/or to (Continued)

reduce windage on the rim-rotor. A sealing system may reduce gas leaks from a fuel conduit into the engine air intake.

16 Claims, 27 Drawing Sheets

(51) Int. Cl.
| | |
|---|---|
| F02C 3/16 | (2006.01) |
| F02C 7/26 | (2006.01) |
| F02C 7/264 | (2006.01) |
| F23R 3/34 | (2006.01) |
| F02K 7/10 | (2006.01) |

(52) U.S. Cl.
CPC ............... *F23R 3/18* (2013.01); *F23R 3/286* (2013.01); *F23R 3/343* (2013.01); *F23R 2900/00012* (2013.01); *F23R 2900/03343* (2013.01); *Y02T 50/672* (2013.01)

(58) Field of Classification Search
USPC ............. 60/767, 39.827, 39.826, 737, 39.35, 60/39.821, 722; 123/306, 210, 260, 261, 123/305
See application file for complete search history.

(56) References Cited

U.S. PATENT DOCUMENTS

| | | | | | |
|---|---|---|---|---|---|
| 1,864,741 | A | * | 6/1932 | Koch | F02C 7/16 415/175 |
| 2,448,972 | A | * | 9/1948 | Gizara | F02C 7/00 60/39.35 |
| 2,471,892 | A | * | 5/1949 | Price | F02C 3/085 415/101 |
| 2,490,064 | A | * | 12/1949 | Kollsman | F25B 3/00 60/39.35 |
| 2,530,281 | A | * | 11/1950 | Barsby | F02B 53/00 123/241 |
| 2,577,918 | A | * | 12/1951 | Rowe | F23R 3/14 431/158 |
| 2,655,906 | A | * | 10/1953 | Udale | F02M 69/00 123/257 |
| 2,782,593 | A | * | 2/1957 | Lee | F02K 7/10 60/263 |
| 2,830,439 | A | * | 4/1958 | Johnson | F23R 3/32 60/737 |
| 2,979,900 | A | * | 4/1961 | Hopper | F23R 3/18 60/262 |
| 3,946,553 | A | * | 3/1976 | Roberts | F23C 6/045 60/733 |
| 6,263,660 | B1 | | 7/2001 | Lawlor | |
| 6,446,425 | B1 | | 9/2002 | Lawlor | |
| 6,510,683 | B1 | | 1/2003 | Lawlor | |
| 6,694,743 | B2 | | 2/2004 | Lawlor et al. | |
| 7,337,606 | B2 | | 3/2008 | Brouillette et al. | |
| 7,685,824 | B2 | | 3/2010 | Dahm | |
| 2003/0014960 | A1 | | 1/2003 | Lawlor | |
| 2004/0016226 | A1 | | 1/2004 | Lawlor et al. | |
| 2004/0016235 | A1 | | 1/2004 | Lawlor et al. | |
| 2004/0020185 | A1 | | 2/2004 | Brouillette et al. | |
| 2011/0167789 | A1 | | 7/2011 | Dahm | |
| 2011/0315789 | A1 | * | 12/2011 | Bachman | F23R 3/18 239/265.17 |

FOREIGN PATENT DOCUMENTS

| | | |
|---|---|---|
| WO | 96/41073 A1 | 12/1996 |
| WO | 98/27330 A1 | 6/1998 |

OTHER PUBLICATIONS

Lapsa et al. Proceedings of the Combustion Institute 2009, vol. 32, p. 1731-1738, "Hyperacceleration effects of turbulent combustion in premixed step-stabilized flames."

Dahm et al. 4th International Energy Conversion Engineering Conference and Exhibit Jun. 26-29, 2006, pp. 1-15, "Inside-Out Rotary Ramjet Turbogenerator."

Lewis et al. Rocket Engines Assession No. ADA422725, Project Report Grant DAAD190010129, Report Date Dec. 31, 2001, Final Report Apr. 1-30, 2000-2003, All together 24 Pages, "Small Scale Propulsion for Jump Augmentation."

Kendrick et al. Journal of Engineering for Gas Turbines and Power Oct. 2003, vol. 125, p. 885-894, "Combustion System Development for the Ramgen Engine."

Zhang et al. ICIT International Conference on Industrial Technology Dec. 10-12, 2003, Session SS5.3: Electric Vehicle and Alternative Electric Energy, S5 3.2, pp. 1150-1155, "Efficiency Optimisation at DC Drives for Small Electric Vehicles."

Pullen et al. Machines and Drives for Electric and Hybrid Vehicles Jun. 28, 1996, Digest No. 1996/152, pp. 8/1-8/4, "The high speed axial flux disc generator—unlocking the potential of the automotive gas turbine."

\* cited by examiner

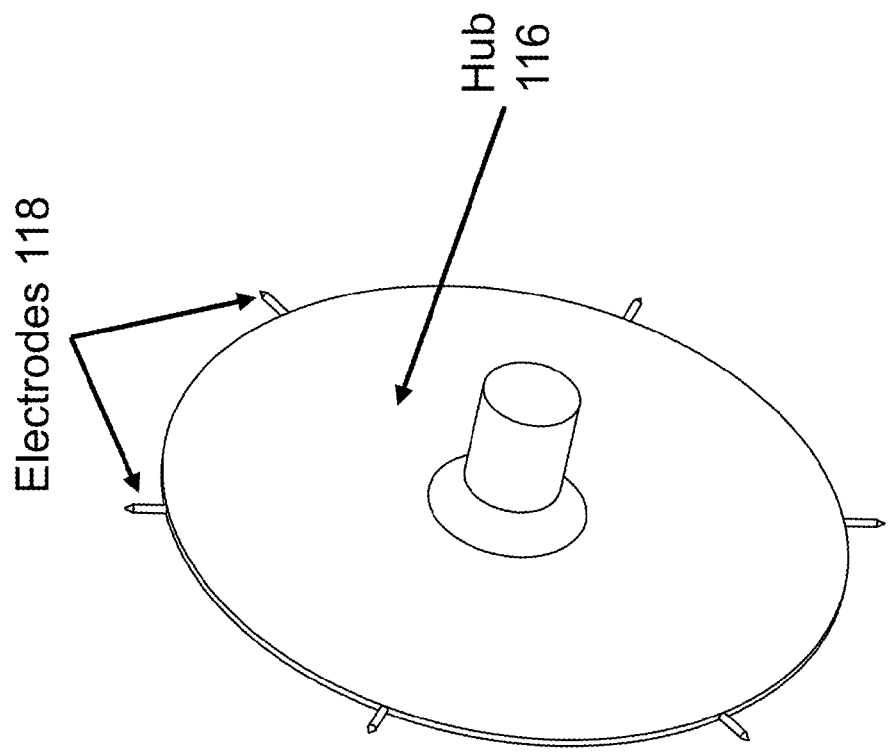

COMBUSTION SYSTEMS AND COMBUSTION SYSTEM COMPONENTS FOR ROTARY RAMJET ENGINES

CROSS-REFERENCE TO RELATED APPLICATION

This application is the U.S. national phase of PCT Application No. PCT/CA2012/000502 filed on May 25, 2012, which claims the benefit of U.S. Provisional Application No. 61/497,569, filed on Jun. 16, 2011, the disclosures of which are incorporated in their entirety by reference herein.

TECHNICAL FIELD

The present disclosure relates to the field of rotary ramjet engines. More specifically, the present disclosure relates to combustion systems and combustion system components for use with rotary ramjet engines.

BACKGROUND

Ramjet engines used in aerospace applications ingest air into an engine inlet at supersonic speeds caused by the forward motion of an airplane or missile. The air is rammed into a smaller opening between a center-body and the engine side wall generating a series of shock waves. These shock waves compress and decelerate the air to subsonic speeds while, at the same time, dramatically raising working flow pressure and temperature. The ramjet effect may also be achieved in a stationary platform by passing an accelerated flow of air over raised sections machined on the rim of a rotor disc. Combined with the high rotation rate of the rotor, this produces a supersonic flow relative to the rotor rim. Interaction between the raised sections of the rim which are rotating at supersonic speeds and the stationary engine case creates a series of shock waves that compress the air stream in a manner similar to ramjet inlets on a supersonic missile or aircraft.

The advent of carbon composite and like materials has enabled the introduction of a reinforcement wall, called rim-rotor, for compensating centrifugal forces generated by rotating components of the ramjet engine. In a rim-rotor rotary ramjet engine (R4E), inlet blades compress the air and fuel mixture with shockwaves, combustion takes place to increase the flow enthalpy and finally the products are accelerated by outlet blades at a high tangential speed to generate shaft power.

Improvements to the rim-rotor rotary ramjet engine are still required in order to reach better fuel efficiency and power output.

SUMMARY

In a first aspect, the present disclosure provides an ignition system for a rotary ramjet engine. The ignition system comprises an air intake, a fuel injection system and an igniter. The igniter ignites fuel before admission of air and fuel into the combustion chamber.

In a second aspect, the present disclosure provides a combustion system for a rotary ramjet engine. The combustion system comprises a combustion chamber, an injection system, an ignition system and a flameholding system. The injection system provides an air and fuel mixture to the combustion chamber. The ignition system ignites the air and fuel mixture. The flameholding system is positioned for communication with the combustion chamber and is adapted to force an ignited flow of the air and fuel mixture toward a center of rotation within the ramjet engine.

In a third aspect, the present disclosure provides an ignition system for a rotary ramjet engine. The ignition system comprises two self-supporting hubs, electrical connections and an electrode. The supporting hubs are positioned co-axially with a combustion chamber. The electrical connections apply a difference of potential between the two self-supporting hubs. The electrode is positioned on one of the two self-supporting hubs and generates a spark to ignite fuel within the combustion chamber.

In a fourth aspect, the present disclosure provides an injection system for a rotary ramjet engine. The injection system comprises an outer radius injector for delivering fuel near an external perimeter of a combustion chamber and an inner radius injector for delivering fuel near an internal perimeter of the combustion chamber. The outer radius injector is adapted to deliver fuel during engine startup if the fuel is heavier than air and to deliver fuel after engine startup if the fuel is lighter than air. The inner radius injector is adapted to deliver fuel during engine startup if the fuel is lighter than air and to deliver fuel after engine startup if the fuel is heavier than air.

In a fifth aspect, the present disclosure provides a rotary ramjet engine comprising a rotor, a combustion chamber positioned within the rotor, an injection system, an ignition system and a stator positioned downstream from the rotor. The injection system provides an air and fuel mixture to the combustion chamber. The ignition system ignites the air and fuel mixture. The stator comprises outlet blades having a divergent shape for reducing a pressure of gases exiting the outlet blades.

In a sixth aspect, the present disclosure provides an impulse turbine for a rotary ramjet engine. The impulse turbine comprises a rotating combustion chamber, a rim-rotor positioned around and adjacent to the rotating combustion chamber, a fuel intake, two fuel conduits and an injector. A first fuel conduit carries fuel from the fuel intake through a cavity within an external wall of the rotating combustion chamber and along an inner face of the rim-rotor. A second fuel conduit carries further the fuel around the rotating combustion chamber, along an outer face of the rim-rotor and back toward the fuel intake. The injector receives the fuel from the second conduit and injects the fuel into the rotating combustion chamber.

In a seventh aspect, the present disclosure provides a rotary ramjet engine comprising a fuel injection system, a combustion chamber, an air intake, a fuel conduit and a sealing system. The air intake admits air into the combustion chamber. The fuel conduit carries fuel from the fuel injection system into the combustion chamber. The sealing system reduces gas leaks from the fuel conduit into the air intake.

The foregoing and other features will become more apparent upon reading of the following non-restrictive description of illustrative embodiments thereof, given by way of example only with reference to the accompanying drawings.

BRIEF DESCRIPTION OF THE DRAWINGS

Embodiments of the disclosure will be described by way of example only with reference to the accompanying drawings, in which:

FIG. 9b shows details of a hub of FIG. 9a;

DETAILED DESCRIPTION

In the description of the Figures, like numerals represent like elements of the present disclosure.

Concepts for Combustion Systems and for Combustion System Components for Use in Rotary Ramjet Engines The present disclosure introduces improvements made to combustion systems for rotary ramjet engines. Some of these improvements are applicable to various types of ramjet engines including, but not limited to, applications of rim-rotor rotary ramjet engines (R4E). Various embodiments of the ramjet engine presented herein differ from earlier apparatuses in one or more of the following aspects of the configuration of their combustion systems:

An injection configuration that may be modifiable between starting and running phases;

An impulse turbine providing a rim-rotor drag reduction and cooling;

Two ignition systems, comprising at least one of:
An intake ignition system; and
A dual-hub integrated spark ignition system;

A flameholding system for high-g field combustion adapted to a communicating combustion chamber;

An outlet blade configuration adapted to a communicating combustion chamber;

A diverging outlet stator to maximize the power of the engine; and

A sealing system to separate cooling, reactants and combustion products.

Some ramjet engine embodiments may comprise one, several, or all of the above listed improvements.

Figure 1:
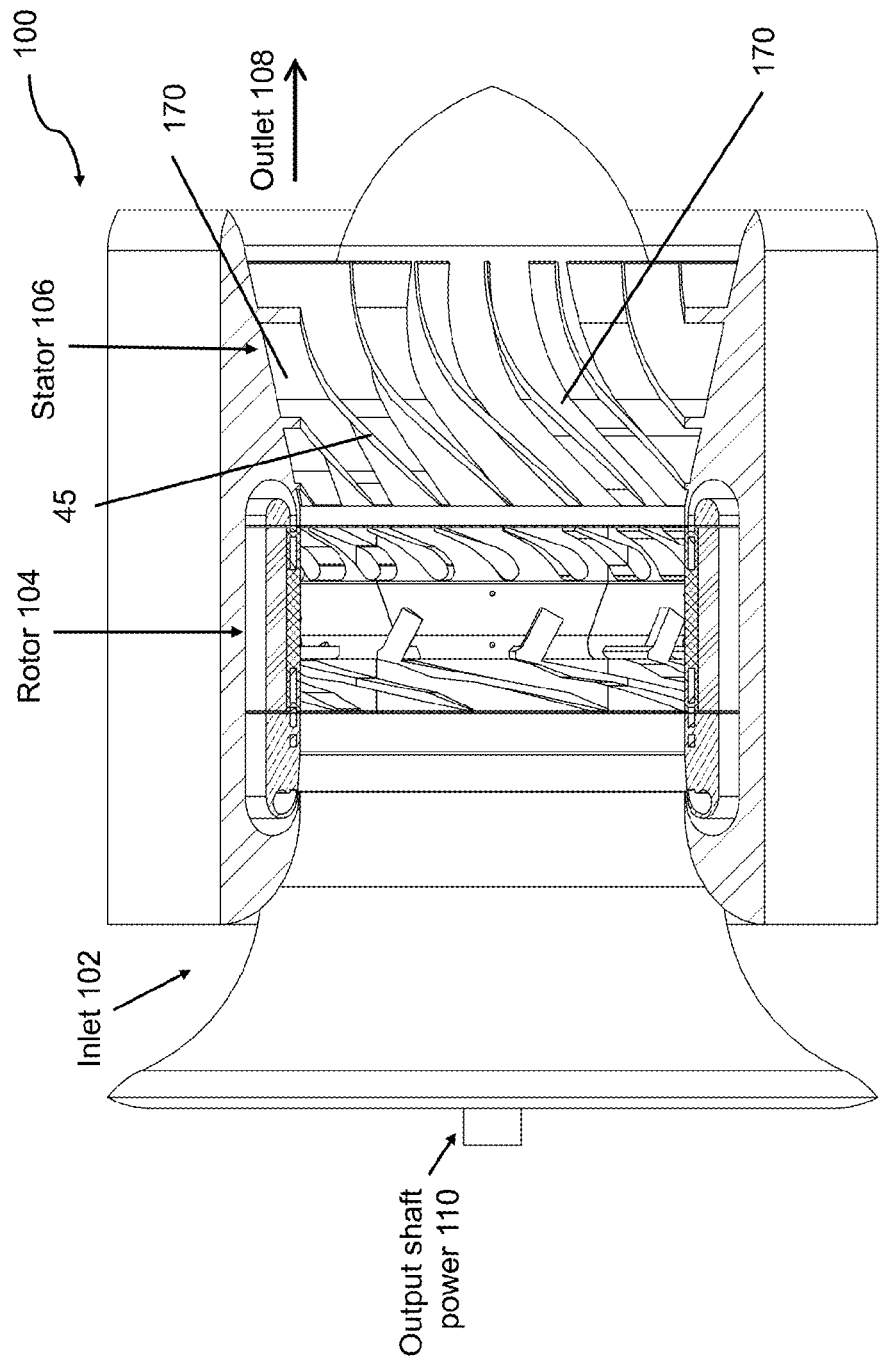
FIG. 1 is a side elevation partial cutaway view of a rim-rotor rotary ramjet engine (R4E) according to an embodiment.
Figure 2:
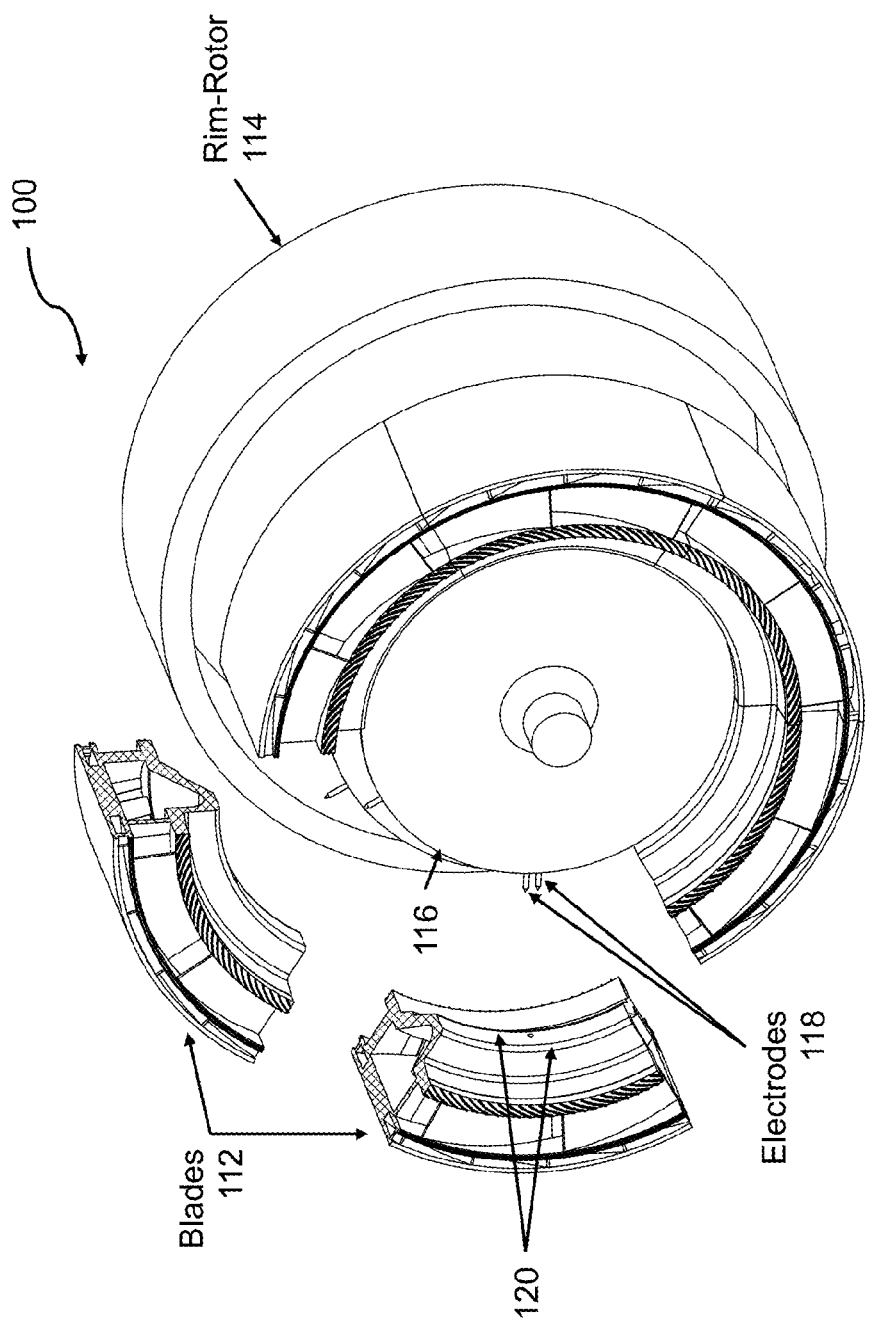
FIG. 2 is an exploded view showing some components of the R4E of FIG. 1.

Reference is now made to the Drawings, in which FIG. 1 is a side elevation partial cutaway view of a rim-rotor rotary ramjet engine (R4E) according to an embodiment. FIG. 2 is an exploded view showing some components of the R4E of FIG. 1. A R4E 100 generally comprises an air intake 102, also called an inlet, a rotor 104, a stator 106, an outlet 108 and an output power shaft 110. Ramjet blades 112 and impulse turbine blades assembly (shown on later Figures) are built in sections to allow expansion as the rotation speed increases. The centrifugal loads are supported by a rim-rotor 114, as expressed hereinabove. The parts are assembled on a hub 116 by sliding on electrodes 118 to allow the deformation. A sliding joint 120 may also be substituted by a flexible joint (not shown).

Figure 3:
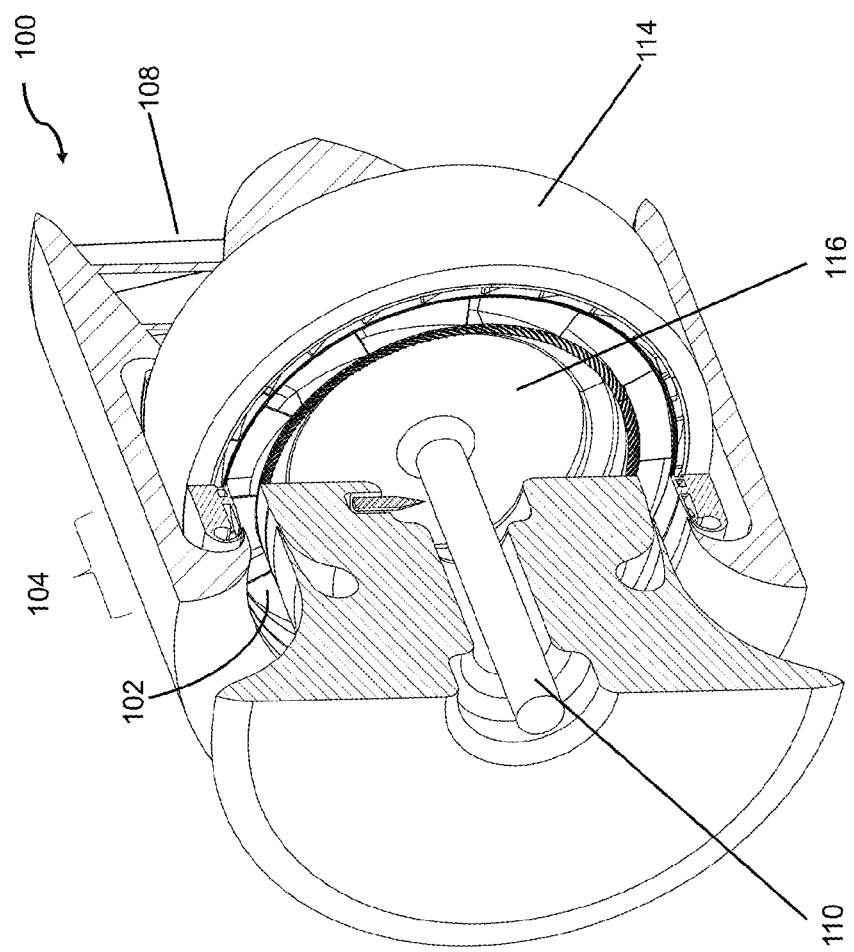
FIG. 3 is a perspective, partial cutaway view of the R4E of FIG. 1 as seen from a front angle.
Figure 4:
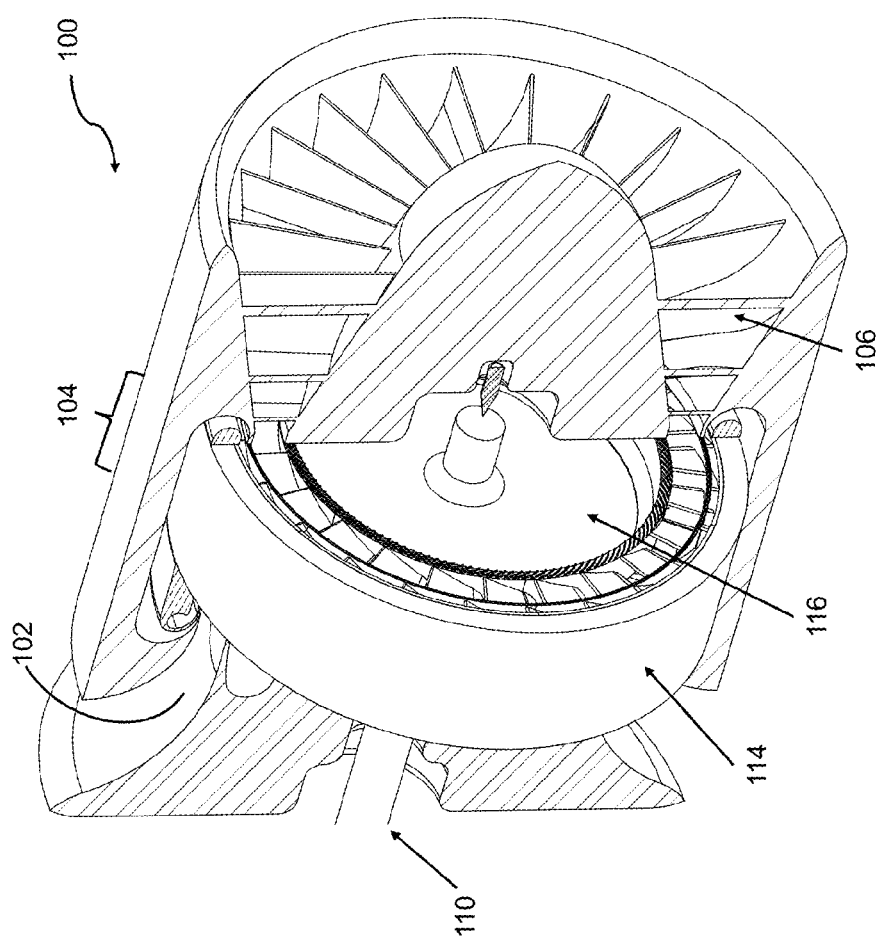
FIG. 4 is a perspective, partial cutaway view of the R4E of FIG. 1 as seen from a rear angle.
Figure 5:
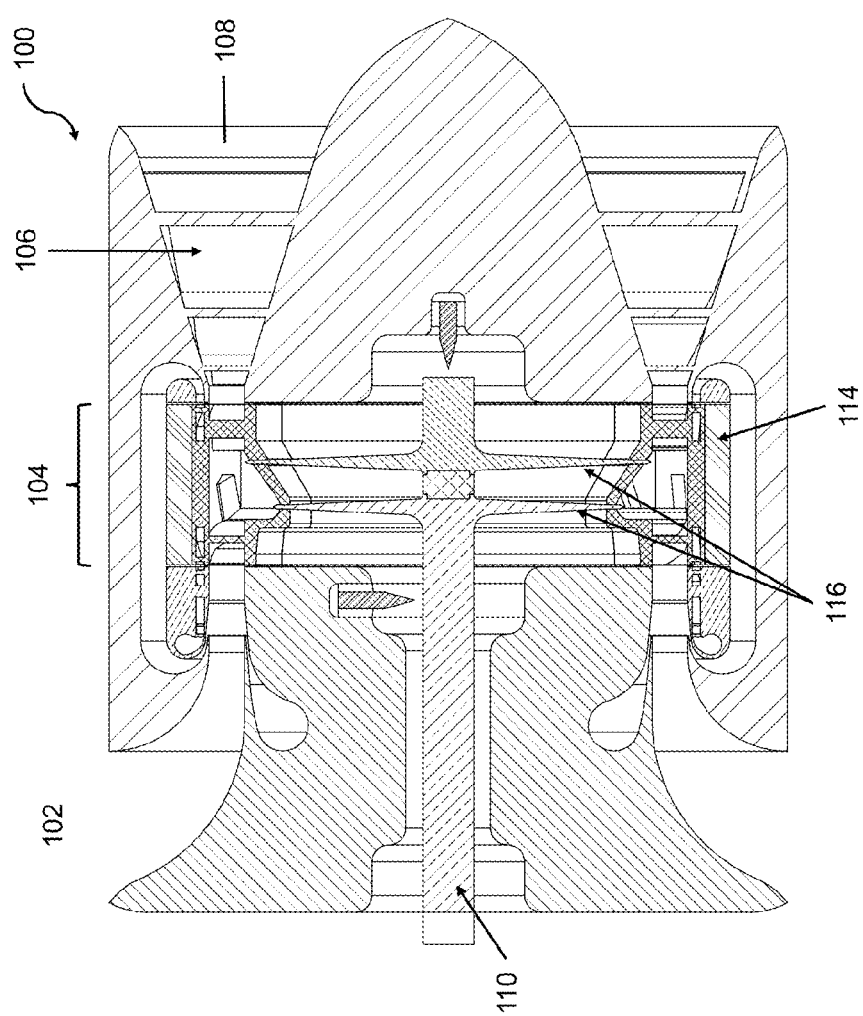
FIG. 5 is a side elevation, full cutaway view of the R4E of FIG. 1.
Figure 6:
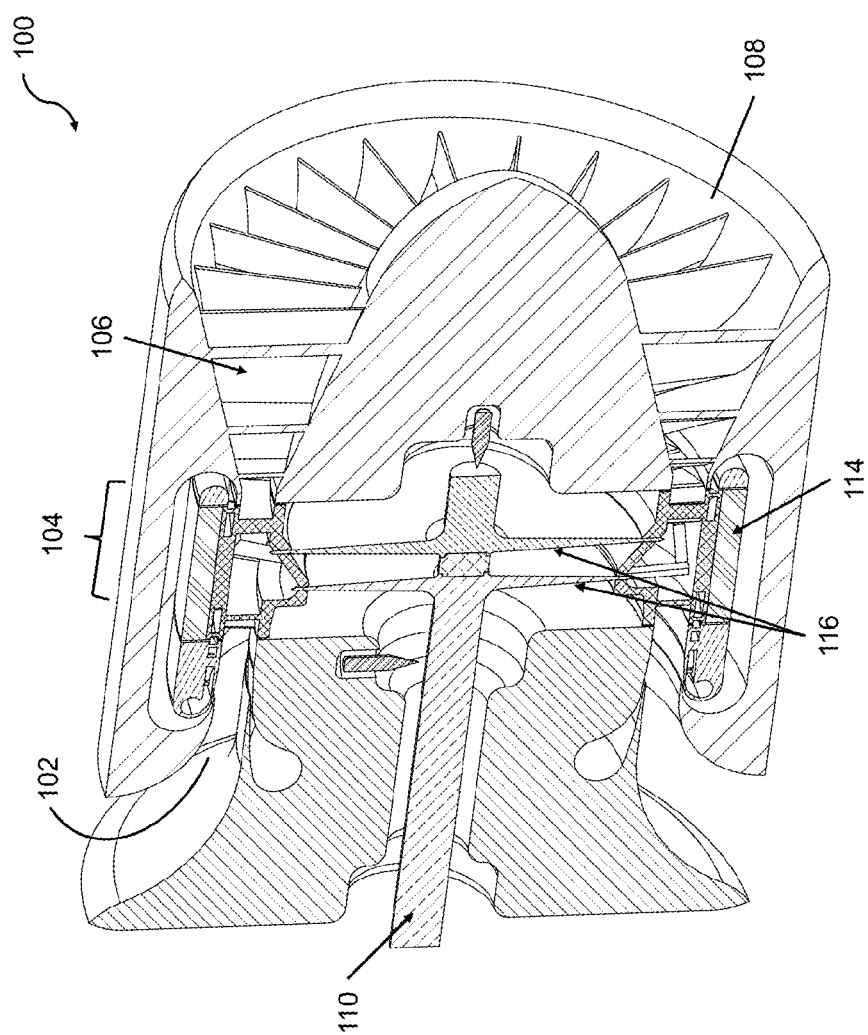
FIG. 6 is a perspective, full cutaway view of the R4E of FIG. 1 as seen from a rear angle.

Other R4E 100 views are provided on FIGS. 3-6. FIG. 3 is a perspective, partial cutaway view of the R4E of FIG. 1 as seen from a front angle. FIG. 4 is a perspective, partial cutaway view of the R4E of FIG. 1 as seen from a rear angle. FIG. 5 is a side elevation, full cutaway view of the R4E of FIG. 1. FIG. 6 is a perspective, full cutaway view of the R4E of FIG. 1 as seen from a rear angle. Some elements appearing on FIGS. 1-6 are introduced hereinbelow.

Injection

Figure 7:
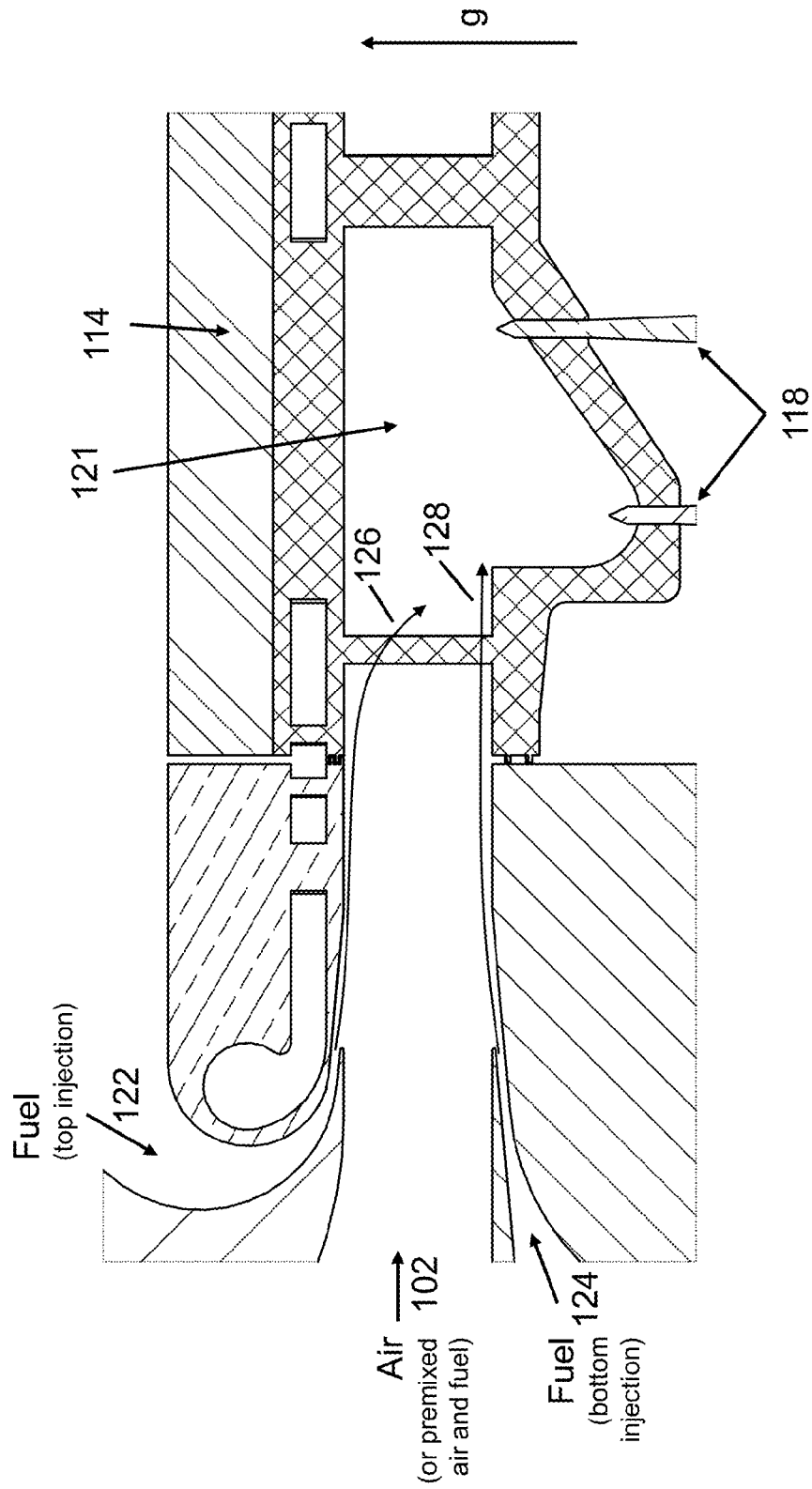
FIG. 7 is a side elevation, cutaway view of an injection system of the R4E of FIG. 1.

FIG. 7 is a side elevation, cutaway view of an injection system of the R4E of FIG. 1. FIG. 7 details an area identified by dashed line A-A on FIG. 5. Fuel may be delivered in a combustion chamber 121 of the R4E 100 already premixed or in two injectors forming a stratified injection: an injector 122 on the outer radius of the intake (top) and an injector 124 on the inner radius of the intake (bottom). For a light gas, such as hydrogen, the top, outer radius injector 122 uses an effect of the high centrifugal force gravity field (g-field), illustrated by the arrow "g", to deliver fuel and to thereby maximize mixing. Since hydrogen is lighter than air, buoyancy forces tend to push hydrogen toward the rotation center, in a direction shown by arrow 126. On the other hand, the bottom, inner radius injector 124 also uses the g-field to deliver the fuel on the inner radius, in a direction shown by arrow 128. This technique is used to obtain a rich mixture on the bottom of the combustion chamber to help ignition with a minimal quantity of fuel.

For a fuel heavier than air, such as propane or liquid fuel, uses of the top and bottom injection are inversed: bottom 124 maximizes mixing and top 122 tends to stratify the fuel on the outer radius.

The stratified injection thus uses the effect of the g-field of the engine to maximize or minimize mixing due to buoyancy effect during various phases of use of the R4E 100.

Ignition

Two ignition techniques are developed: flow ignition in the engine intake and a dual-hub configuration for ignition in the rotating frame.

Intake Ignition

Figure 8:
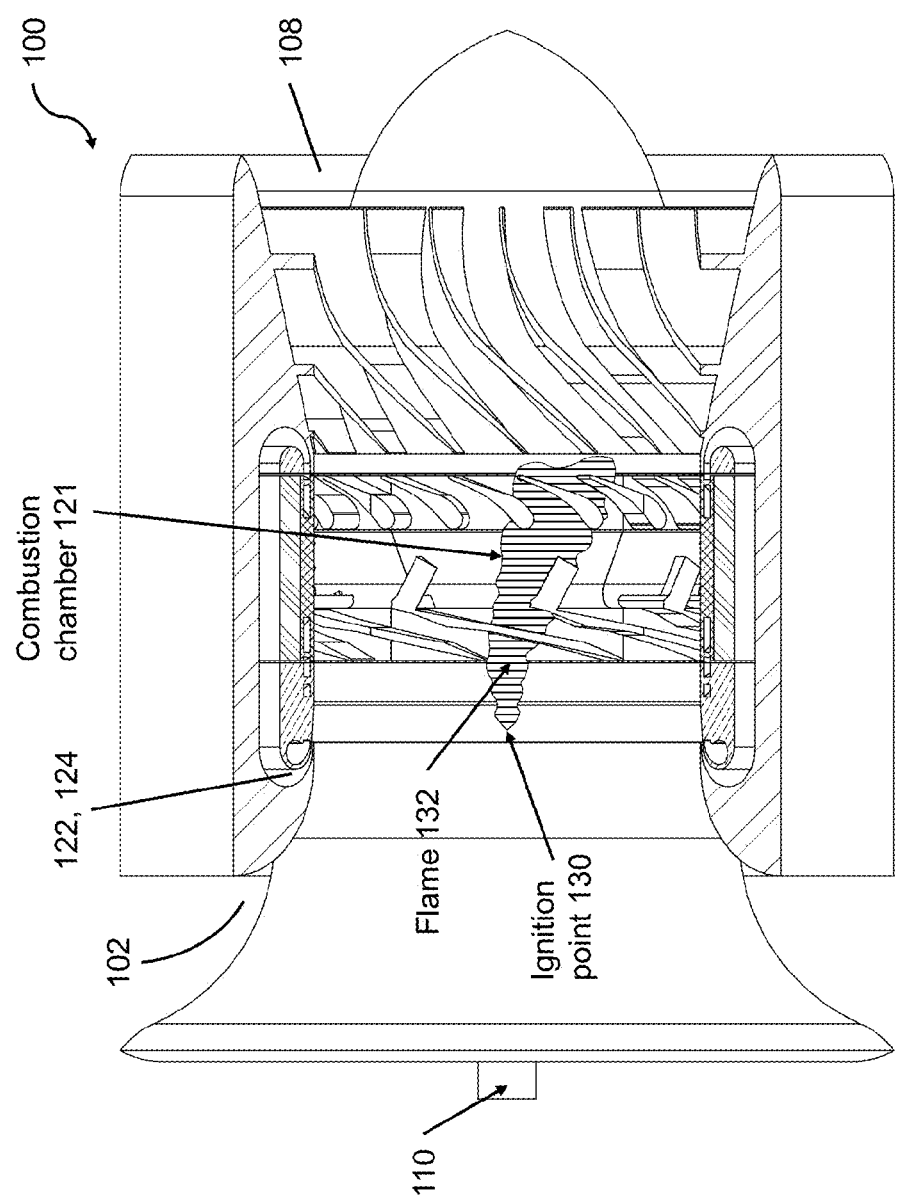
FIG. 8 illustrates a first example of an ignition system of the R4E of FIG. 1.

The present disclosure introduces igniting a rotary ramjet engine with a flame in the intake. FIG. 8 illustrates a first example of an ignition system of the R4E of FIG. 1. The intake ignition concept is to ignite an air and fuel mix in a front section of the engine, before the combustion chamber 121. Elements of the R4E 100 of FIG. 1 are reproduced on FIG. 8. An ignition point 130 having an igniter (not specifically shown) for lighting a flame 132 that propagates into the combustion chamber 121 are added on FIG. 8. The flame 132 is initiated at the ignition point 130 located in the air intake 102. The igniter lights up air admitted into the intake 102, the air being mixed with fuel admitted via one or both of the injectors 122 and 124. The flame 132 then propagates in the engine and ignites the combustion chamber 121. Fuel for a pilot flame may be injected in one point before the igniter, may come from one or both stratified injectors 122 and 124 (top, bottom) or may be completely premixed if the axial velocity is higher than the flame propagation velocity. The igniter at the ignition point 130 may comprise a spark plug, a glow-plug or a source of sparkles (metal in fusion).

The intake ignition concept may be applied in small scale engine applications since removing the ignition parts from the combustion chamber 121, where rotating parts are present, minimizes complexity and dead mass.

Dual-Hub Spark Ignition

Figure 9A:
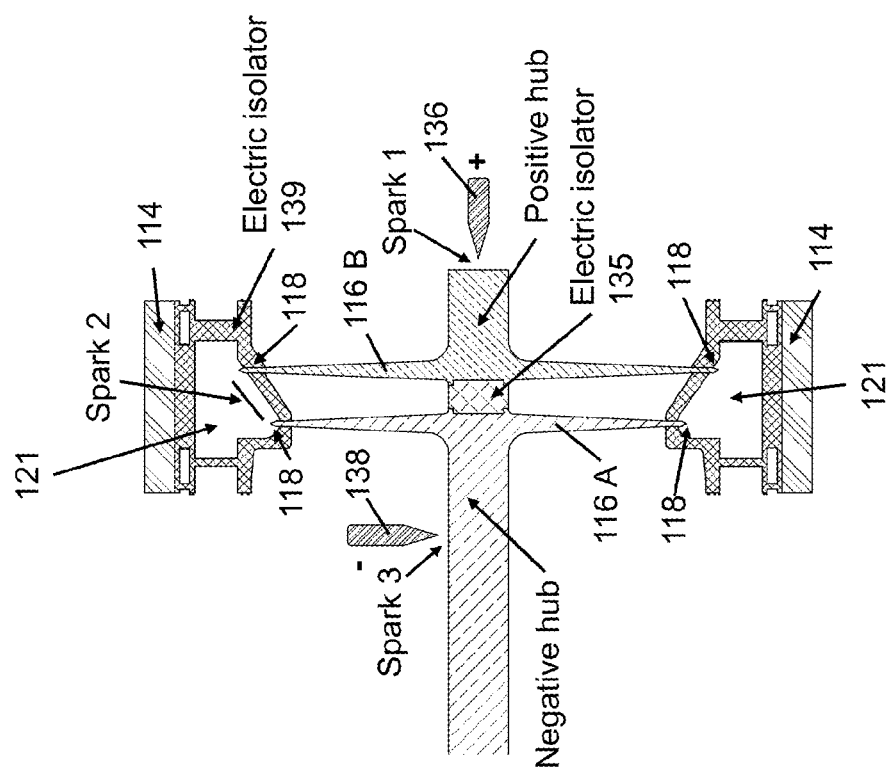
FIG. 9a shows a second example of an ignition system of the R4E of FIG. 1.

The present disclosure introduces a dual hub configuration, having one electrically positive and one electrically negative hub. FIG. 9a shows a second example of an ignition system of the R4E of FIG. 1. FIG. 9b shows details of a hub of FIG. 9a. Referring at once to FIGS. 9a and 9b, a dual-hub configuration is used to apply a difference of potential on two hubs 116A and 116B. These two hubs are shown as hub 116 on earlier Figures. The hubs 116A and 116B are positioned co-axially with the combustion chamber 121. As shown, one hub 116A has a slightly smaller diameter than the other hub 116B so that tips of electrodes 118 protrude into the combustion chamber 121. Other hub configurations may be used according to a desired shape of the combustion chamber 121 and according to a relative placement of the hubs 116A, 116B and of the combustion chamber 121. The hubs 116A and 116B are separated from each other by an electric isolator 135 and from the combustion chamber 121 by another electric isolator 139. The hubs 116A and 116B are self-supported on an axis of rotation of the R4E 100, for example by use of ball-bearings (not shown) or equivalent supports, and do not transfer any load onto the rim-rotor 114.

As shown on FIG. 9a, hub 116A is negatively charged while hub 116B is positively charged. A difference of potential between the two hubs 116A and 116B creates a spark, identified on FIG. 8 as "Spark 2"; this spark may also be generated in the combustion chamber if the hub 116A has a higher voltage or charge potential than the hub 116B. One of the two hubs may be grounded while the other hub is charged positively or negatively. The difference of potential may be achieved for example by applying a positive charge to the hub 116A and by grounding the hub 116B. Other manners of creating a difference of potential, or a difference of charge, on the two hubs are well-known to those of ordinary skill in the art. The difference of potential creates Spark 2 in the combustion chamber 121 to thereby ignite the air and fuel mixture.

Electrical connections apply the difference of potential between the two hubs 116A and 116B. In an embodiment, the positive hub 116B may be either charged with a spark between a fixed electrode 136 and the hub 116B (spark 1) or with a brush (not shown). The negative hub 116A may discharge by a spark between the hub 116A and an electrode 138 (spark 3), a brush (not shown), or directly by the bearings or hydrodynamics bushings (also not shown). The Spark 2 in the combustion chamber 121 may occur between two electrodes 118, igniting the fuel, or between an electrode 118 and a conductor (not shown) in the combustion chamber 121. This conductor may be realized either as a coating or as a small part added to the combustion chamber 121.

Though a plurality of electrodes 118 are shown on the hub 116 of FIG. 9b, embodiments may rely on a single electrode 118 on each hub 116, the Spark 2 being created between a single pair of electrodes 118. Additionally, even though electrodes 108 may be positioned at a plurality of locations on the circumference of the hubs 116A and 116B, forming a plurality of pairs of electrodes 118, releasing of electrical charges on the hubs 116A and 116B may create, at any given time, a Spark 2 at any single pair of electrodes 118, in a random fashion. Igniting a rotary ramjet in a single point of a communicating combustion chamber is thus introduced herein.

Additionally, blades sliding on the electrodes allow rim-rotor elongation. The sliding joint 120 of FIG. 2 (or the flexible joint mentioned hereinabove) may be positioned between the self-supporting hubs 116A and 116B and the rim-rotor 114 of the ramjet engine 100.

Combustion

A configuration of a communicating combustion chamber adapted to rotary ramjet engines with high-g field combustion is introduced herein. An example of a configuration including three flameholders positioned on inlet blades is adapted to the communicating combustion chamber in the rotary ramjet engine. A top flameholder may be attached to inlet blades in a positive configuration. A vertical flameholder is configured from bottom to top. A bottom flameholder is also introduced.

Figure 10:
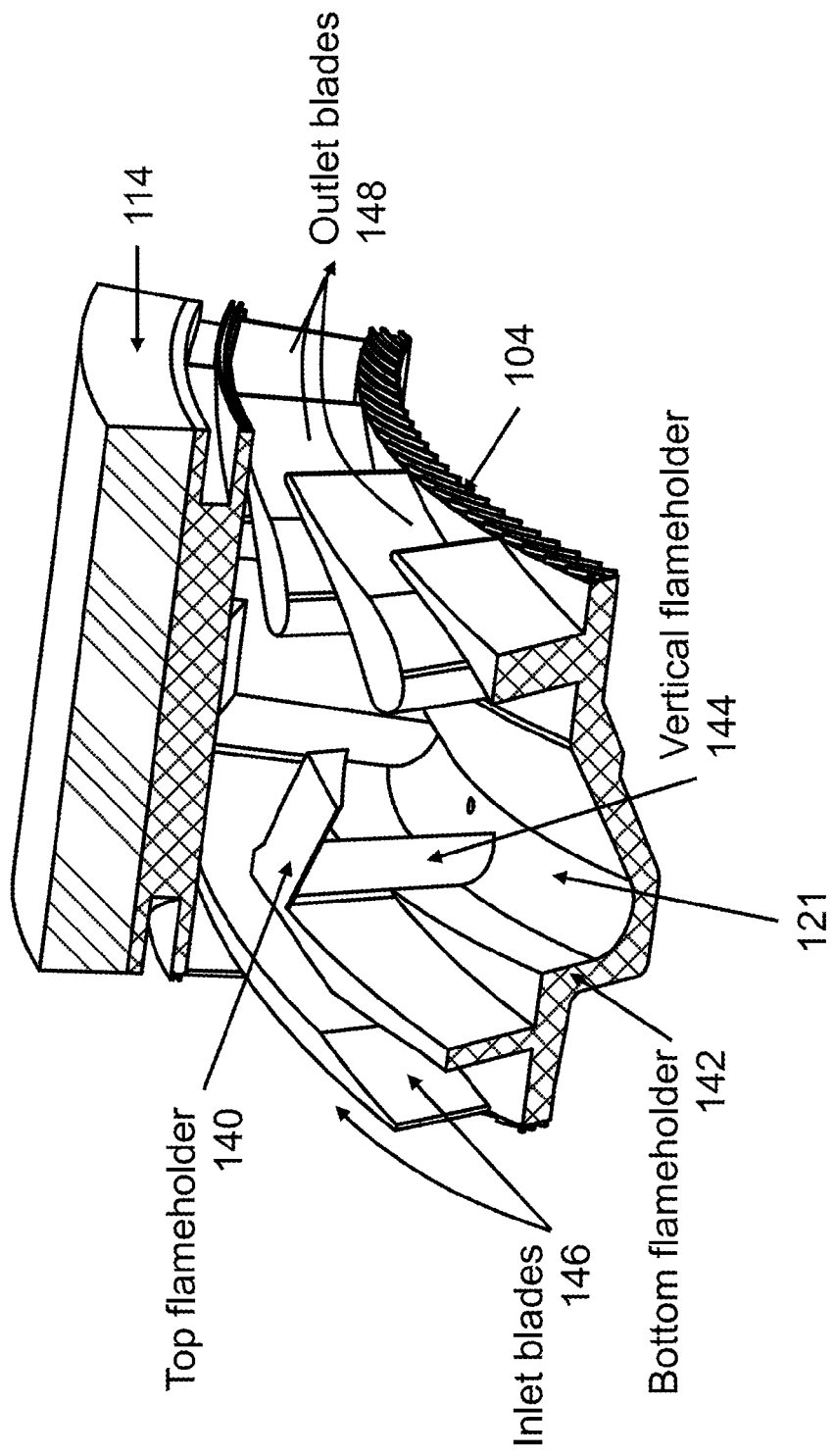
FIG. 10 is a perspective cutaway view of a flameholding system of the R4E of FIG. 1.

FIG. 10 is a perspective cutaway view of a flameholding system of the R4E of FIG. 1. A single, continuous combustion chamber 121 for communicating ramjets around the R4E 100 is used to maximize the volume and to ignite with a single ignition point. Flameholders are placed to maximize combustion efficiency. In an embodiment, a first flameholder 140 is placed on the top of the combustion chamber to allow the flame to propagate from outward to inward. A second flameholder 142 may be added to the bottom of the combustion chamber to connect the ramjets together with a single ignition point. A third flameholder 144 may vertically connect the top to the bottom. Flameholders 140, 142 and 144 may be placed on one inlet blade 146. In some variants, a flameholder set comprising some or all of the three (3) flameholders 140, 142 and 144 may be placed on each of a plurality of inlet blades 146 positioned around the rotor 104, or on all inlet blades 146. Other variants and combinations will readily come to mind to those of ordinary skill in the art having the benefit of the present disclosure.

The top flameholder 140 allows the flame to sustain on a side of the rim-rotor 114. A difference with earlier known concepts is the positive configuration. Instead of being a material removal in the rim-rotor 114, it is added material that forces the flow to go toward the rotation center and maximize the zero-velocity region for maintaining the flame. This positive configuration may use the bottom flameholder 144 to leave sufficient space for the flow to turn downward. Another difference is the configuration suitable for the communicating combustion chamber 121. In the embodiment shown, one flameholder set is annexed to each inlet blade 146 and placed perpendicular to the flow.

Figure 11:
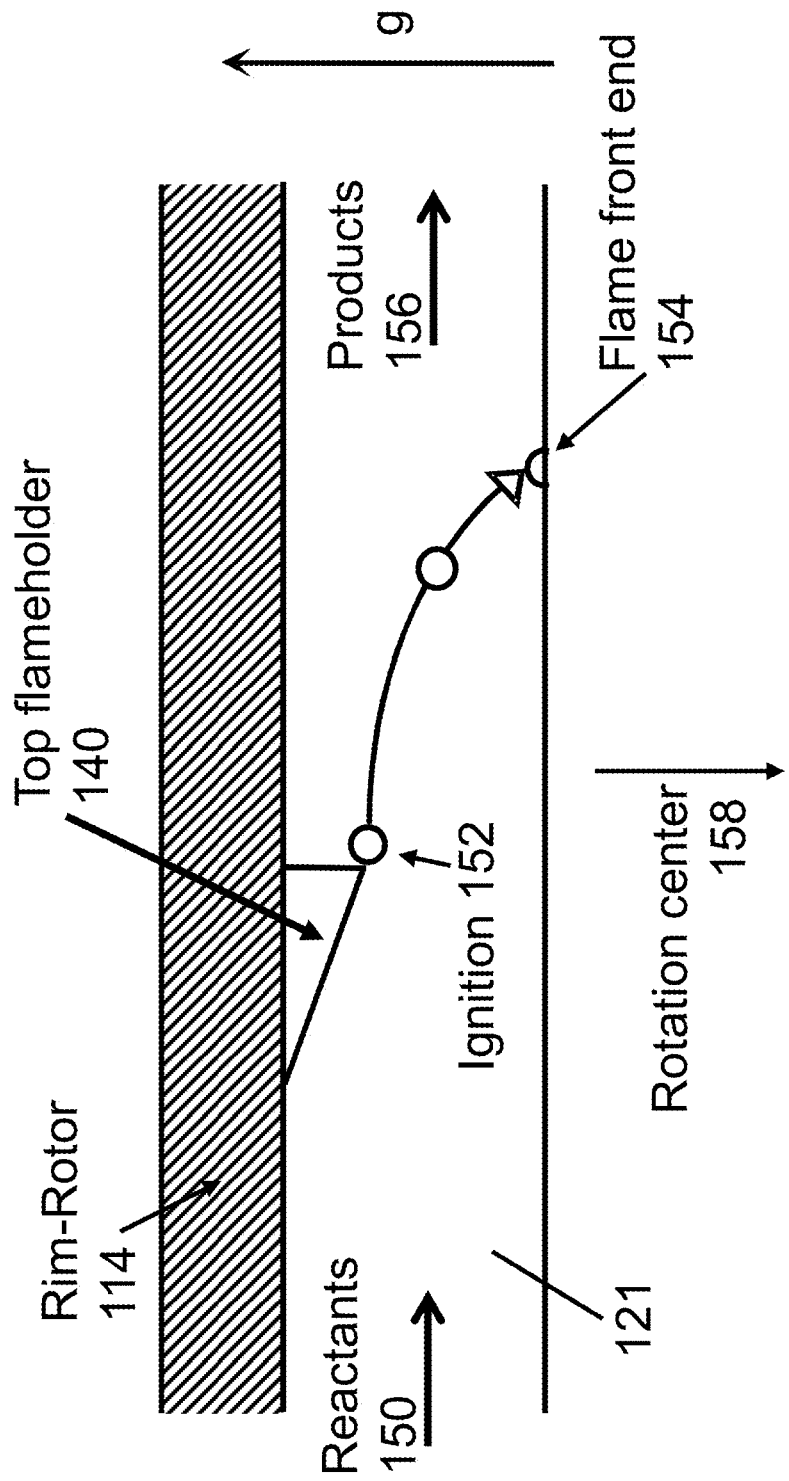
FIG. 11 is a schematic illustration showing gaseous flows in a combustion chamber comprising the flameholding system of FIG. 10.
Figure 12:
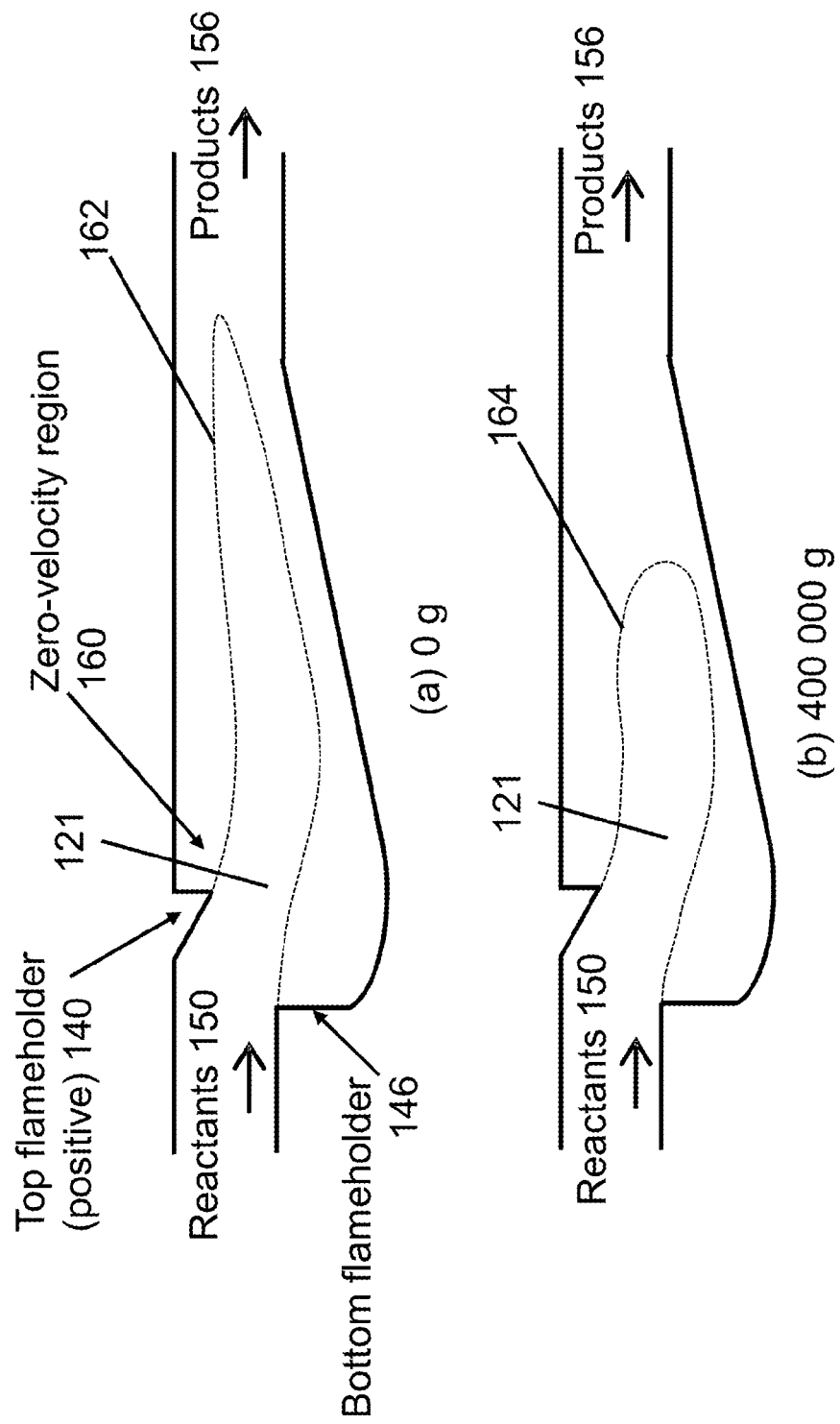
FIG. 12 is a schematic illustration showing temperature gradients in the combustion chamber comprising the flameholding system of FIG. 10.

FIG. 11 is a schematic illustration showing gaseous flows in a combustion chamber comprising the flameholding system of FIG. 10. FIG. 12 is a schematic illustration showing temperature gradients in the combustion chamber comprising the flameholding system of FIG. 10. Reactants 150 comprising a mix of air and fuel enter the combustion chamber 121 Reactants 150 ignite at an ignition point 152 downstream from the top flameholder 140 and are pushed in a downward direction, toward the rotation center 158, by the top flameholder 140. When the rotor is not creating any centrifugal force (0 g), this creates a region 160 of zero velocity aft of the top flameholder 140, substantially near an external radius of the combustion chamber 121. Under a condition of low centrifugal force, a flame front generally follows a nearly straight line 162 and combustion products 156 are expelled along the outlet blades 148. At high velocity of the rotor 104, under heavy centrifugal forces (e.g. 400 000 g), the flame front generally follows line 164 and is driven toward the rotation center 158, reaching a flame front end 154 substantially near an internal radius of the combustion chamber 121.

Returning to FIG. 10, the injection system comprising either or both of the injectors 122 and 124 provides the air and fuel mixture, forming the reactants 150, to the combustion chamber 121. One of the ignition systems described hereinabove ignites the air and fuel mixture. The flameholding system, which is in communication with the combustion chamber 121, forces a resulting ignited flow of the air and fuel mixture toward a center of rotation 158 within the ramjet engine 100. The flameholding system may be adapted for high centrifugal force gravity field (g-field) combustion. In various embodiments, the flameholding system may comprise one or more of the top flameholder 140, the vertical flameholder 144, and the bottom flameholder 142. The flameholding system may be positioned on one or more inlet blades 146 of the combustion chamber 121. The combustion chamber 121 may also comprise curved outlet blades 148 that are capable of withstanding supersonic outlet speeds.

Returning now to FIG. 8, the intake ignition concept introduced hereinabove may be used in combination with the flameholding system of FIG. 10. A geometry of bottom flameholders 142 allow a flame obtained from an ignited air and fuel mixture to benefit from centrifugal acceleration to thereby stabilize within the combustion chamber 121. Vertical flameholders 144 allow the flame to propagate against buoyancy within the centrifugal force gravity field. Top flameholders 140 maintain the flame within the combustion chamber. Overall, the flameholding system of the combustion chamber 121 allow ignition within the extreme centrifugal force gravity field by capturing the flame from the air intake 102 and propagating it towards the top of the combustion chamber 121.

Outlet Blades

Figure 13:
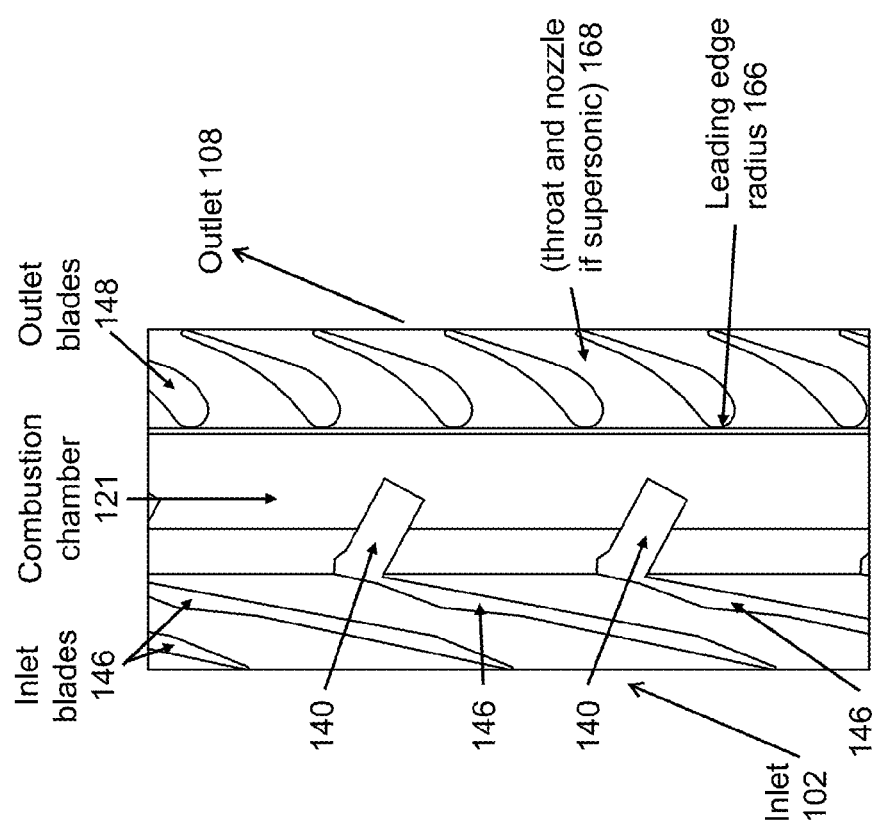
FIG. 13 shows details of outlet blades of the R4E of FIG. 1.

FIG. 13 shows details of outlet blades of the R4E of FIG. 1. In embodiments where all the ramjets are communicating in the combustion chamber 121, there is no wall to keep the flow parallel to the inlet blades 146. Therefore, the flow may turn axially during the combustion and straight outlet blades are not used. Curved blades 148 are similar to a supersonic turbine stator to turn the flow as tangentially as possible. A leading edge radius 166 is first used to adapt for the velocity angle. The flow then turns subsonicly up to the throat 168. The flow reaches Mach 1 at the throat 168 and expands in a supersonic nozzle.

Curved outlet blades 148 with a throat 168 and a nozzle may thus go from subsonic to supersonic rates.

Outlet Stator

A stator configuration introduced herein allows lowering the pressure after the rotor 104. This increases the outlet tangential velocity and therefore the output power. The high velocity at the outlet of the rotor 104 is then converted into pressure first by a divergent and then with a rotation of the flow toward the axial direction. Finally, the outlet pressure is reduced toward atmospheric pressure. Some configurations of the stator 106 may increase the output power, the increase reaching up to 25% in some embodiments.

Returning to FIG. 1, the stator 106 as shown has a frusto-conical shape having a circumference diverging by about 7 degrees (7°) in a direction of the outlet 108 of the rotary ramjet engine 100. Additionally, as may be seen on FIG. 1, the stator 106 may comprise blades 170 that are further curved to increase area. Therefore, in an embodiment, the R4E 100 comprises the rotor 104, the combustion chamber 121 positioned within the rotor 104, one or both of the injectors 122 and 124 forming the injection system for providing the air and fuel mixture to the combustion chamber 121, one of the above described ignition systems for igniting the air and fuel mixture, and the stator 106 positioned downstream from the rotor 104, having a divergent shape for reducing a pressure of gases exiting the outlet blades. The stator 106 may for example have 7 degrees of divergence. The stator 106 may further comprise internal curved blades 170, the blades 170 being curved, for example, in a range between 20 and 60 degrees from a rotation axis of the engine 100 (a range of about 45 degrees is shown on FIG. 1). The blades 170 may further be curved at their extremities to align with a rotation axis of the engine 100, extending perpendicularly from the rotation axis.

Impulse Turbine

Figure 14:
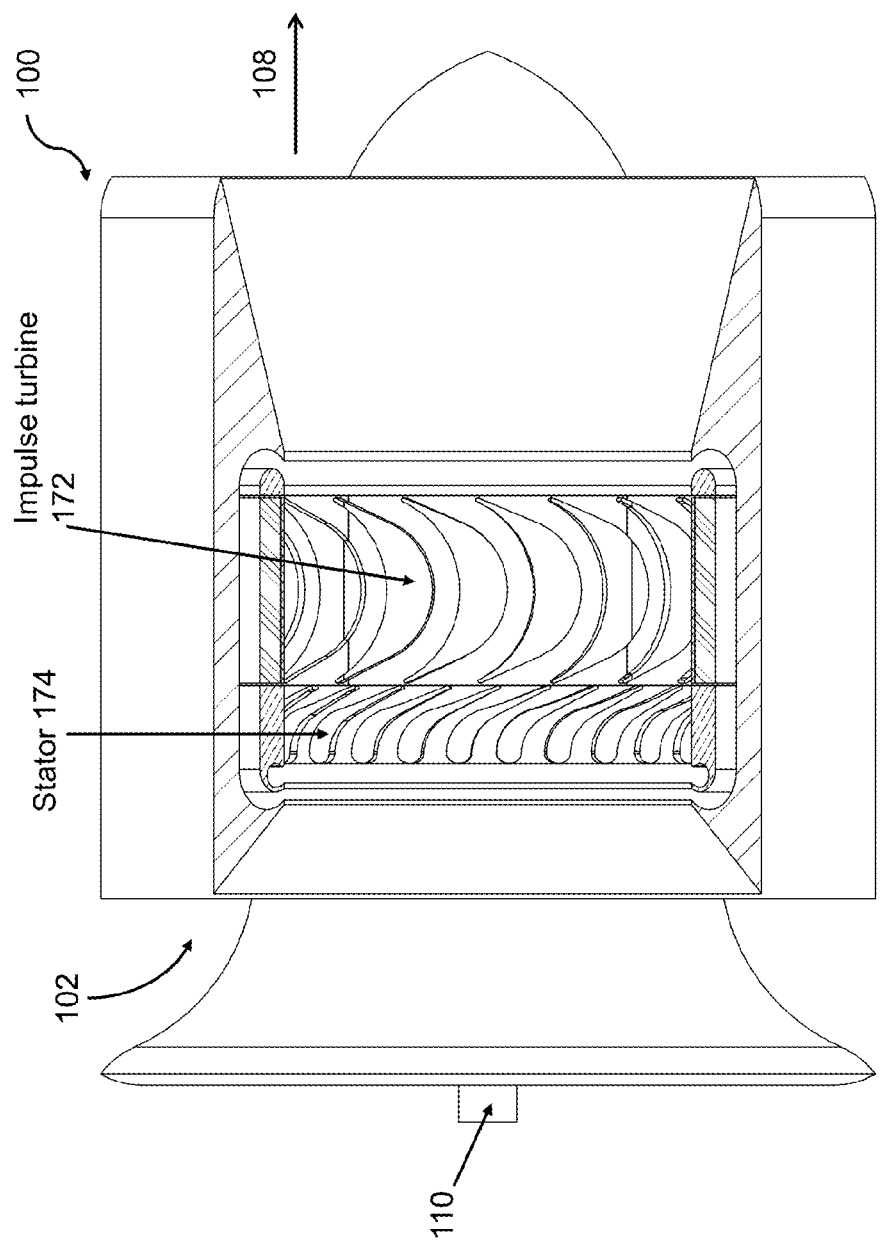
FIG. 14 shows an impulse turbine in an embodiment of a R4E.

According to an aspect of the present disclosure, an impulse turbine may be used between the ramjets and the rim-rotor 114. FIG. 14 shows an impulse turbine in an embodiment of a R4E. When gaseous hydrogen is used as fuel, high pressure from the fuel may be transformed in shaft power by an impulse turbine 172 and used as rim-rotor 114 cooling. Hydrogen is first accelerated by nozzles on an input stator 174, which generates high velocity and lowers static temperature. Kinetic energy is then recovered by the impulse turbine 172 and the low temperature flow of hydrogen offers cooling between the combustion chamber 121 and the rim-rotor 114. Hydrogen is then directed on an outer surface of the rim-rotor 114 to minimize windage losses and to maintain an acceptable temperature. Finally, the hydrogen is injected in the combustion chamber 121. In some embodiments, the input stator configuration 154 may increase the output power up to 5%.

If liquid hydrogen is used, the very low temperature liquid may be injected directly around the rim-rotor 114 for cooling and windage reduction. The impulse turbine 172 may be replaced by cooling blades (not shown) that aspirate low temperature gaseous hydrogen. The hydrogen is finally injected in the combustion chamber 121.

Figure 15:
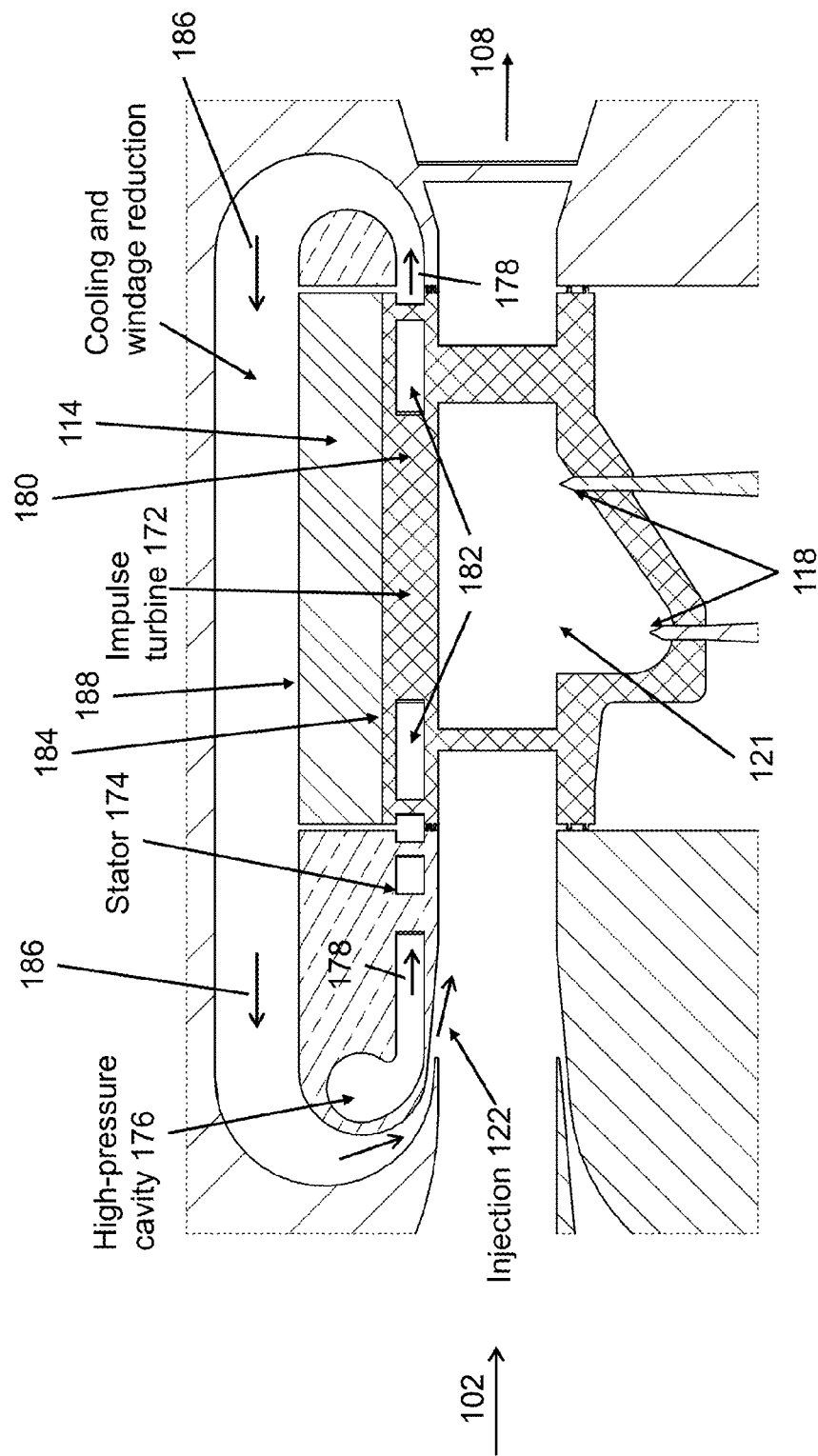
FIG. 15 shows a fuel path in the impulse turbine of FIG. 14.

FIG. 15 shows a fuel path in the impulse turbine of FIG. 14. The impulse turbine 172 comprises a rotating combustion chamber 121. The rim-rotor 114 is positioned around and adjacent to the rotating combustion chamber 114. Fuel is injected in a high-pressure cavity 176 forming a fuel intake. A first fuel conduit 178 is formed through passages in the inlet stator 174 and the impulse turbine 172 for carrying fuel from the fuel intake through a cavity 182 within an external wall 180 of the rotating combustion chamber 121 and along an inner face 184 of the rim-rotor 114. A second fuel conduit 186 carries further the fuel around the rotating combustion chamber 121, along an outer face 188 of the rim-rotor 114, and back toward the fuel intake 176. The fuel is received from the second conduit 186 at the injector 122. The injector 122 delivers the fuel into the air intake 102 toward the rotating combustion chamber 121. The flow of the fuel into and around the rotating component cools the rim-rotor 114 and the rotating combustion chamber 121.

In some applications, the fuel is a gaseous fuel whose pressure decreases as it passes through the first and second conduits. As a result, the flow of the fuel into and around the rotating combustion chamber 121 reduces windage on the rim-rotor 114.

In an embodiment, the impulse turbine 172 may be adapted for use with cryogenic fuels, such as hydrogen or other light gases, in the cavity 182. Cryogenic fuels (H2, CH4) passing around the engine may cool the outer surface 188 of the rim-rotor 114 while also minimizing windage losses. In a variant, cryogenic fuels may be injected around the rim-rotor 114 and self-aspirating cooling blades (not shown) positioned between the rim-rotor 114 and the ramjets.

Sealing System

Figure 16:
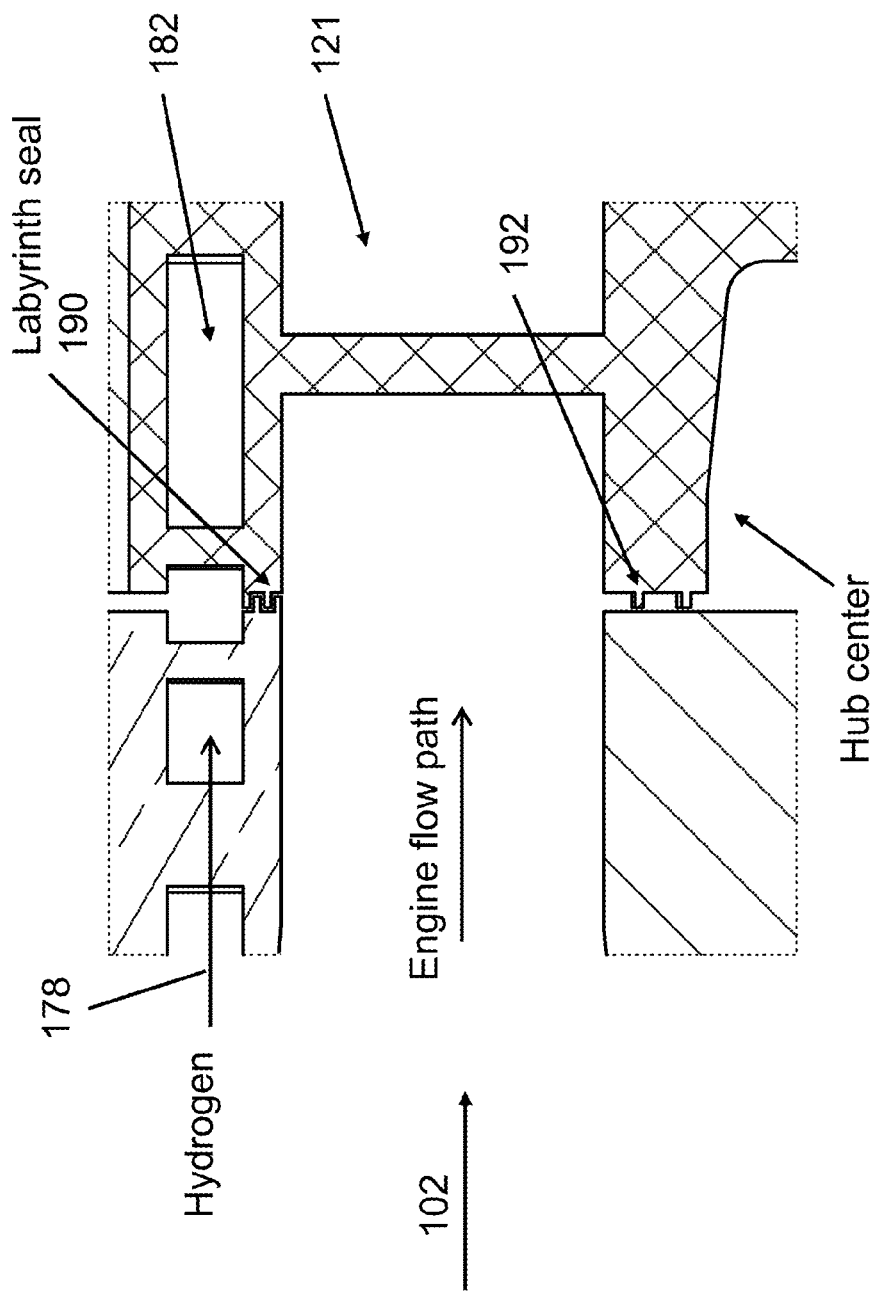
FIG. 16 shows details of a gas sealing system between static and dynamic parts of a R4E according to an embodiment.
Figure 17:
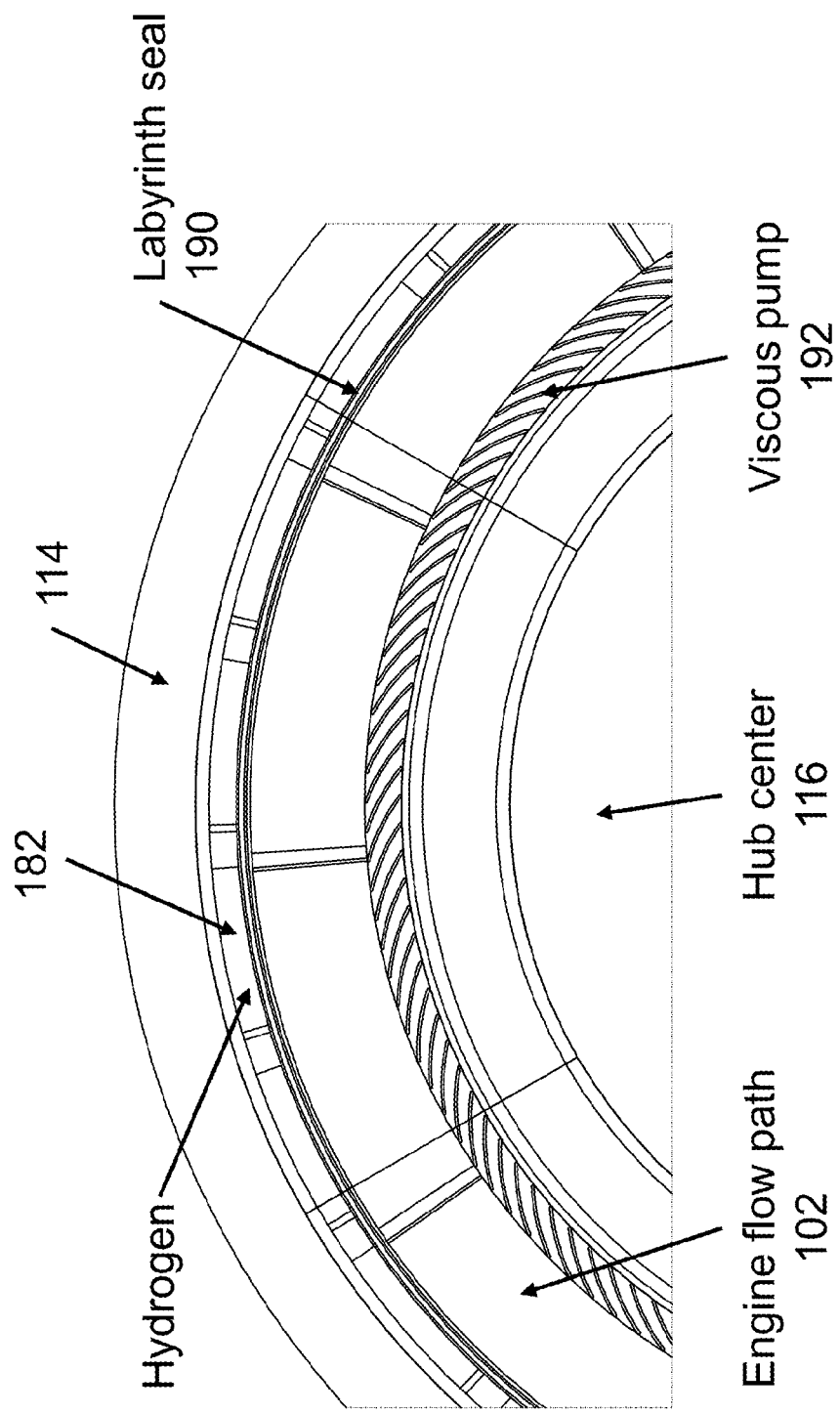
FIG. 17 is a partial front cutaway view of a R4E showing placement of the gas sealing system of FIG. 16.

In a variant, labyrinth seals minimize the different gases exchange in a rotary ramjet engine 100 configuration, and a viscous pump is present between the different gas sections. FIG. 16 shows details of a gas sealing system between static and dynamic parts of a R4E according to an embodiment. FIG. 17 is a partial front cutaway view of a R4E showing placement of the gas sealing system of FIG. 16. Seals may be used to separate fuel, for example hydrogen, from the rim-rotor 114, the engine flow path in the air intake 102 and the center of the hub 116. Two types of seals may be used in some embodiments of a R4E 100 configuration: a labyrinth seal 190 and a viscous pump 192. The idea of the labyrinth seal 190 is to maximize a length of the flow path and minimize the height of the path as shown on FIG. 16. The viscous pump 192 has blades that build a pressure gradient to equilibrate the difference in pressure and the centrifugal forces.

An embodiment of the R4E 100 may thus comprise a fuel injection system according to one or more of the above described embodiments of the injectors 122 and 124, the combustion chamber 121, the air intake 102 for admitting air into the combustion chamber 121, a combination of conduits 178 and 186 forming a fuel conduit for carrying fuel from the fuel injection system into the combustion chamber 121, and a sealing system for reducing gas leaks from the fuel conduit 178, 186 into the air intake 102. Some embodiments of the sealing system may comprise one or more viscous pumps 192. In other embodiments, one or more labyrinth seals may form the sealing system. In yet other embodiments, combinations of the viscous pump 192 and of the labyrinth seal 190 may be present in the sealing system.

Prototype of a High Power Density Rim-Rotor-Rotary Ramjet Engine

As expressed in the foregoing description of concepts for combustion systems and their components, the rim-rotor rotary ramjet engine (R4E) is a propulsion system design with potential to improve power density and reduce complexity of conventional gas turbines, thus making it an interesting alternative for future transportation and stationary power systems. This section presents the design of a proof-of-concept prototype that may sustain 560 m/s (200 000 rpm) and transient combustion, which is initiated by an integrated ignition system. A high strength carbon-PEEK composite winding is used around the ramjet blades to support the high g-load and includes the flameholder.

Introduction to the Prototype

Figure 18:
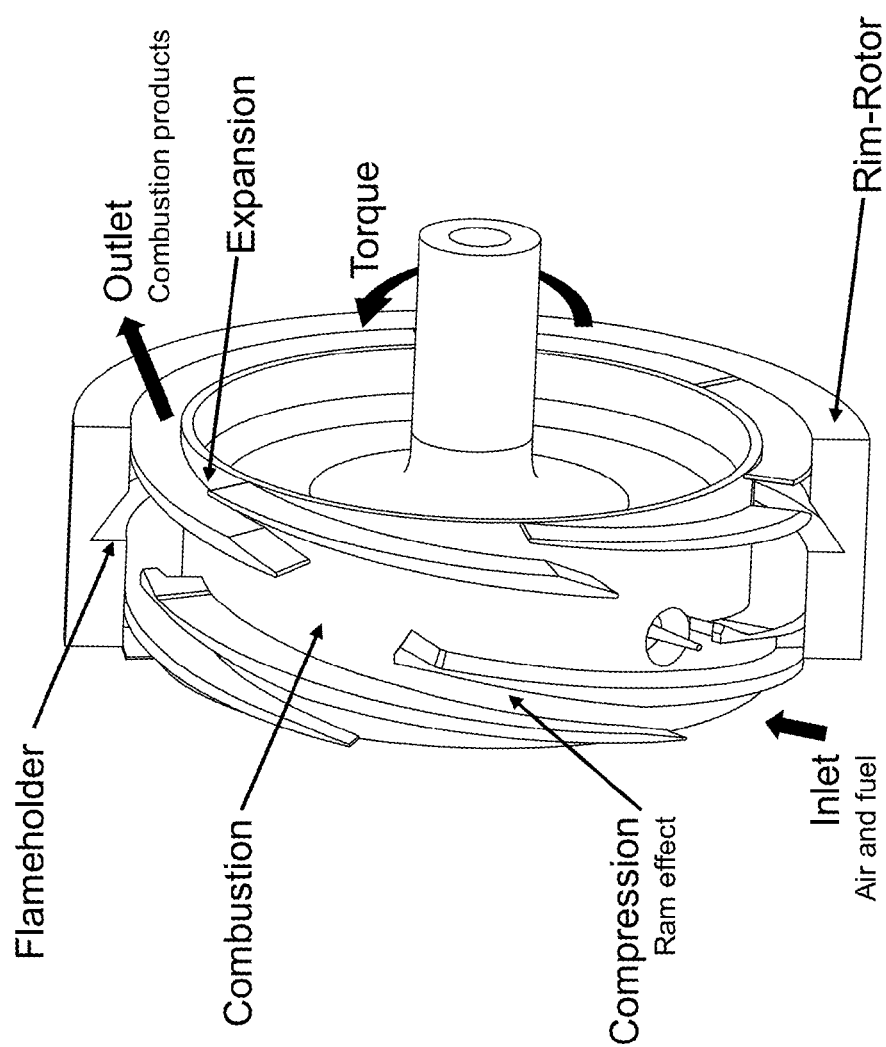
FIG. 18 is a perspective, partial cutaway view showing an example of a R4E concept.

The design of a proof-of-concept of a new type of low-cost, high power density engine, the R4E, is illustrated in FIG. 18, which is a perspective, partial cutaway view showing an R4E concept.

A linear ramjet engine achieves a complete open Brayton cycle in a suitably shaped flow channel using the compressibility property of gases at high Mach number, without a traditional compressor and turbine. The low number of parts reduces design and manufacturing costs compared to the ~4000 rotating parts of a conventional megawatt-sized gas turbine. In a rotary ramjet engine, ramjet shapes spins around a center axis at high angular velocity so that the airflow in the engine inlet is supersonic. The complete thermodynamic cycle is then achieved in a single stage, including compression, combustion and expansion within a single rotating assembly. An enabling concept of the prototype is to use a high strength carbon-fiber rim-rotor around the ramjet blades in addition to a compliant joint to sustain the extremely high centrifugal loads occurring at supersonic rim speeds. The simplicity of the R4E design further brings potential for power density improvements considering that a prediction of 7.6 kW/kg is possible for units of 500 kW nominal power. Efficiencies are expected to be equivalent or slightly lower than gas turbine of comparable scale.

Considering its characteristics, one use of the R4E technology is where a high power density is desired for short durations. Large aircrafts use gas turbines as auxiliary power units (APU) to produce power to start the first engine and to power on-board accessories. Carrying this extra dead mass involves high costs. As an example, on the Boeing 747, the equivalent shaft power of a Pratt & Whitney PW901a APU is 1136 kw (1543 Hp) with a power density of 3.4 kW/kg, including the electric generator. For applications involving Personal Air Vehicles (PAV) and jetpacks, it is also desired to high power density combined with a high reliability, but without the high cost of regular gas turbines.

Small gas turbines may also be used for hybrid electric vehicles (HEV) to reduce the overall cost of the powertrain. A range extender—powered by fossil fuel engine—may be used to extend the range of the vehicle without having to carry extra batteries. Multiple car and gas turbine manufacturers have invested millions of dollars to develop this technology, like Jaguar with its C-X75 hybrid sport car prototype.

Prototype Design

Figure 19:
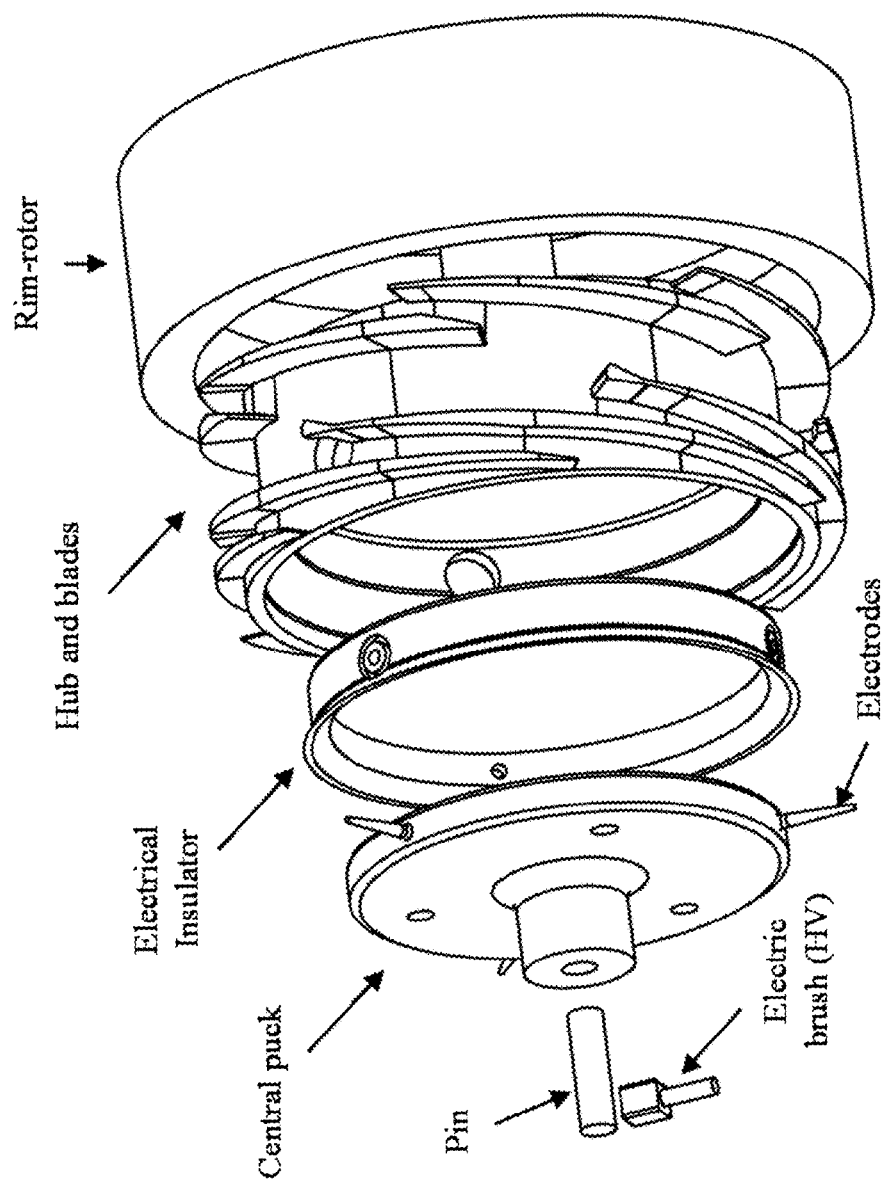
FIG. 19 is a perspective exploded view of a R4E prototype design.
Figure 20:
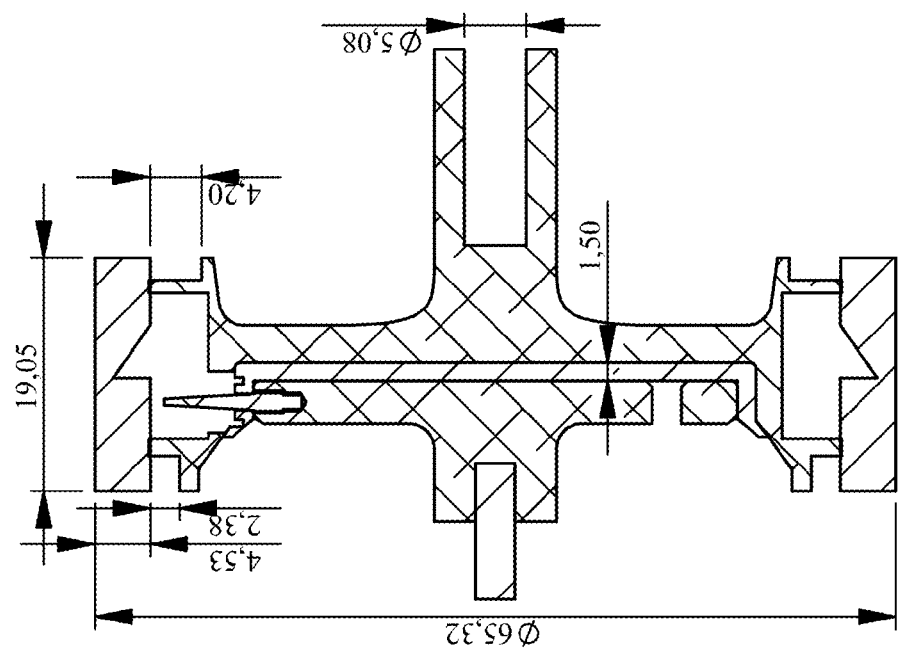
FIG. 20 is a side elevation, sectional view on the R4E prototype of FIG. 19, showing dimensions in mm.

Several structural concepts were evaluated and the selected concept is shown in FIG. 19, which 19 is a perspective exploded view of a R4E prototype design. FIG. 20 is a side elevation, sectional view on the R4E prototype of FIG. 19, showing dimensions in mm. A rim-rotor made of Carbon-PEEK, high strength thermoplastic composite, supports partially the centrifugal forces of the ramjet blades. A "V" groove is machined in the inner part of the carbon fiber to act as a reversal flameholder that improves flame propagation due to buoyant forces applied on the burned gases.

A spark ignition system has been selected for its reliability and ease of implementation. Laser ignition could also be used, but was set aside for building the prototype because of its complex synchronization to time ignition with passing rotor blades.

No thermal insulation is provided between the ramjet engine and the rim-rotor as this engine is mainly designed for transient high-temperature use. At 560 m/s, the blade temperature is estimated to be the total temperature of the flow, which is 458 K without combustion. Thus, high performance 7075 T6 aluminum is appropriate for the hub. Three holes are machined from the combustion chamber to allow the electrodes to reach the center puck. A machined polyimide part isolates electrically the center puck from the hub. Aluminum electrodes are screwed in the center puck to provide an ignition source that may sustain the high g field during operation. Finally, an interference fit of 0.2 mm on the diameter holds the rim-rotor around the hub and blades.

A polyimide insulator (Dupont Vespel™ SCP-50094) that confines high voltage to the three electrodes is glued to the assembly using Emerson & Cuming Eccobond™ 104 adhesive. High voltage is supplied to the engine by using an electric brush in contact with a steel pin press-fitted in the center puck. The engine is electrically grounded on its shaft using the same technique.

Figure 21:
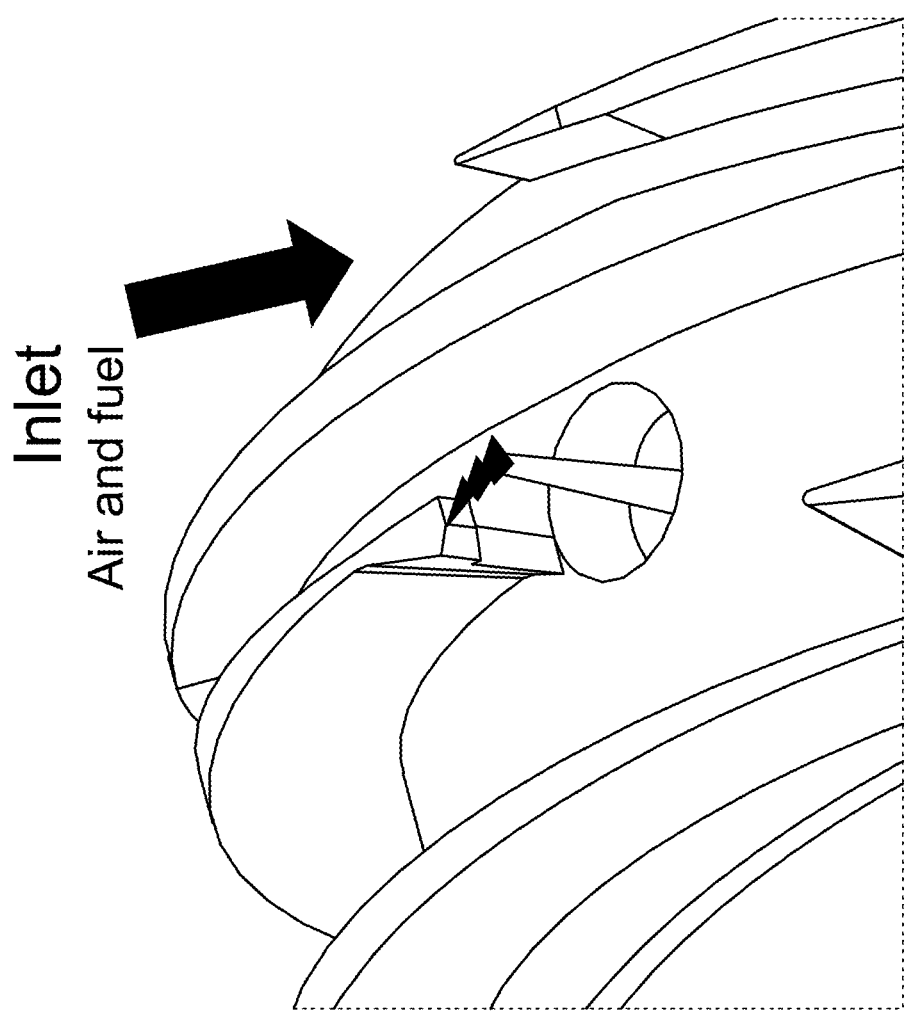
FIG. 21 is a perspective view of a detail of the R4E prototype of FIG. 19, showing a spark location.

A spark is created randomly between the 3 electrodes and the ramjet blades through an air gap of about 1.5 mm, without contact with the carbon fiber rim-rotor, as shown on FIG. 21, which is a perspective view of a detail of the R4E prototype of FIG. 19, showing a spark location. Electrodes are made of Al 7075 T6 aluminum alloy with 1-64 threads on the lower part. An experiment has shown that six threads may resist to a tensile load of 910 N, which lead to a safety factor of 3 according to a finite element analysis (FEA) at 200 000 rpm. The overall weight of the rotor assembly is 79 grams, excluding the driving shaft of the experimental set-up.

Structural Principle

Figure 22:
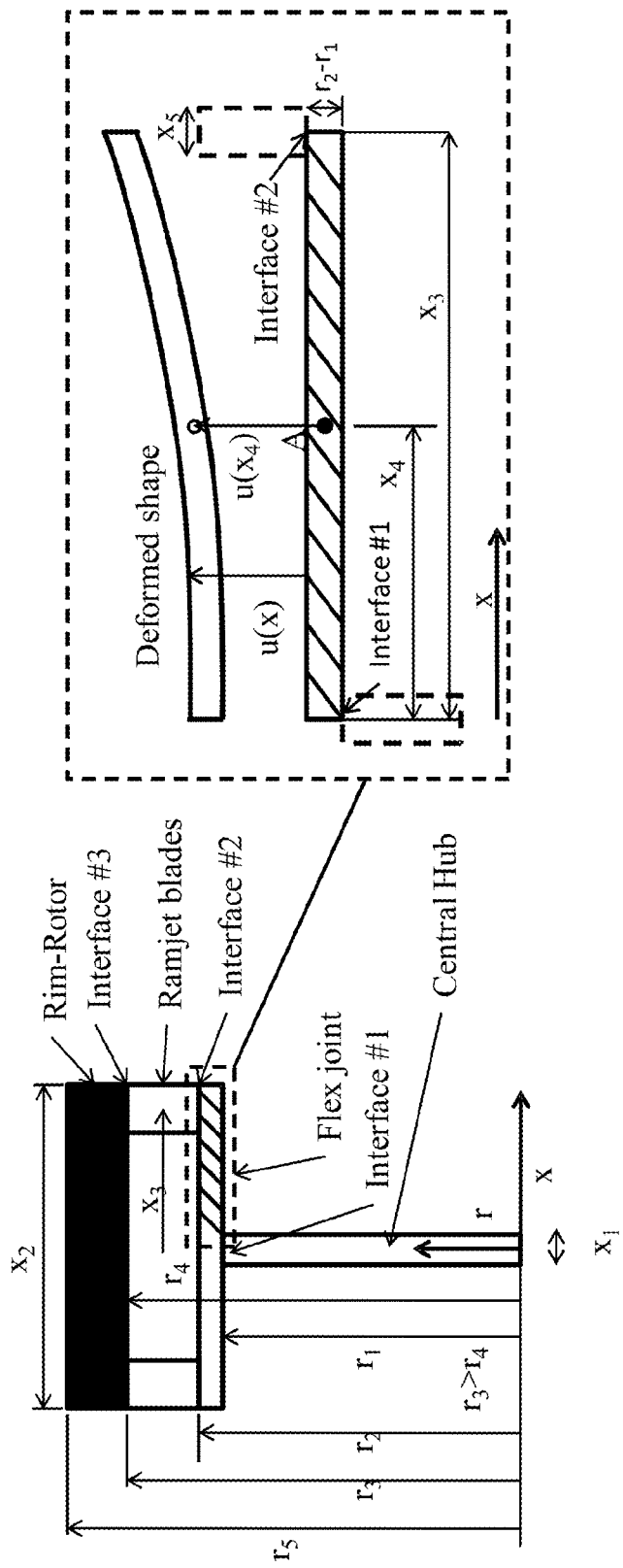
FIG. 22 is a schematic diagram of a simplified rotor within the R4E prototype of FIG. 19.
Figure 23:
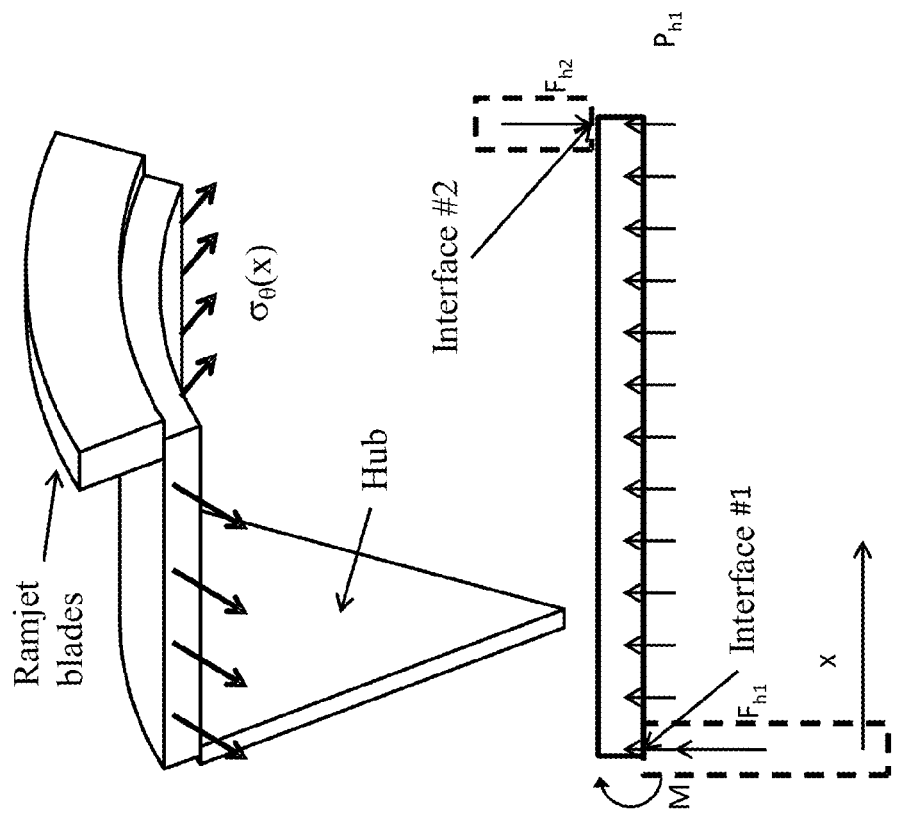
FIG. 23 is a free body diagram of a flex hub according to an embodiment.

FIG. 22 is a schematic diagram of a simplified rotor within the R4E prototype of FIG. 19. In FIG. 22, dimensions shown are before assembly. The Figure presents a simplified rotor, with 4 distinct components: the hub, the flex joint, the ramjet blades and the rim-rotor. Compliance of the flex joint prevents separation of the rim-rotor. FIG. 23 is a free body diagram of a flex hub according to an embodiment. The flex hub is modeled as a beam combining pure bending and circumferential stress.

Prototype Manufacturing

Figure 24:
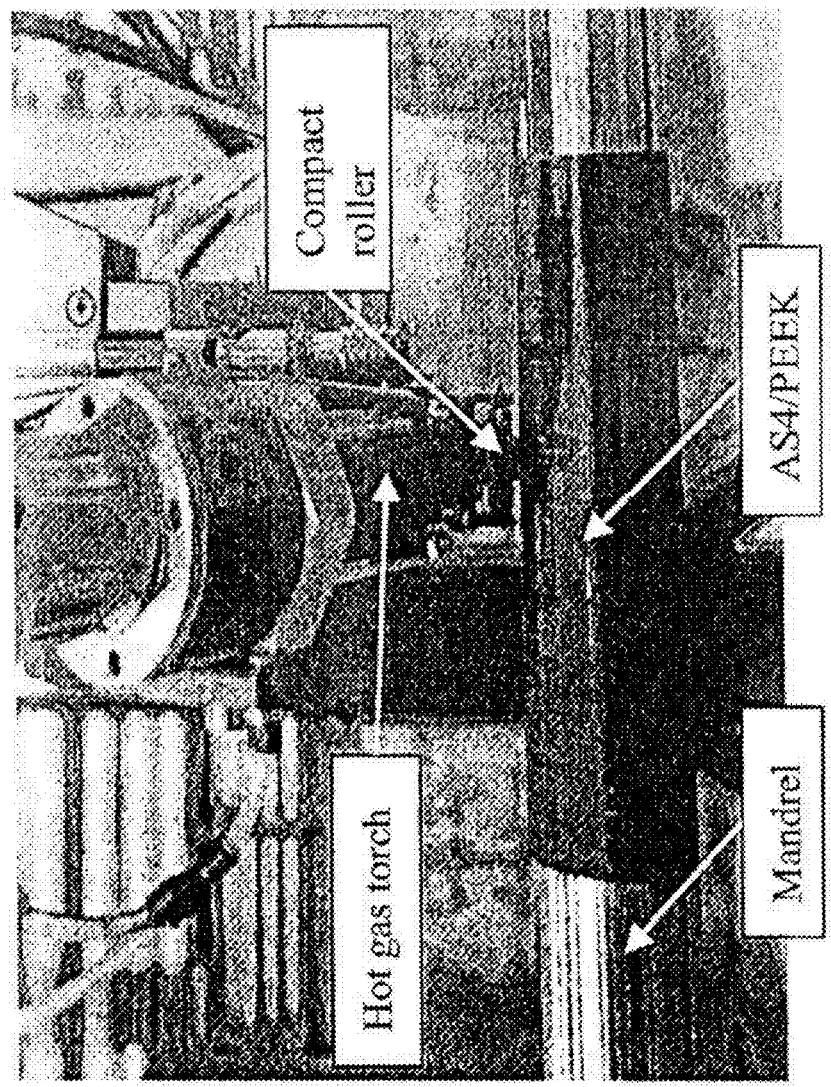
FIG. 24 shows an AS4/PEEK tube manufacturing.

The carbon fiber rim-rotor was manufactured using an automated fiber placement (AFP) technique. FIG. 24 shows an AS4/PEEK tube manufacturing. The material used in this study was AS4/PEEK (APC-2) thermoplastic unitape provided by Cytec Engineered Materials. A steel mandrel with diameter of 56.4 mm was used to roll the 6.35 mm wide and 0.18 mm thick tape, as presented in FIG. 24.

The AS4/PEEK thermoplastic tube was manufactured in a single fiber orientation (90°). An offset of 2.5 mm was applied to each ply in the fiber placement process to provide staggering and to distribute the edge effects. Before the layup started, the mandrel was preheated to about 80° C. using an infrared heating tube. In the fabrication process, the thermoplastic unitape was wrapped on the mandrel by in-situ consolidation. A hot gas (nitrogen) torch was used as a nip-point heater to melt the thermoplastic tape. Pressure was applied on the nip-point by the means of a compaction roller. Table 1 lists the AFP processing parameters for the manufacturing, which were selected according to previous experiments.

TABLE 1

| AFP processing parameters for AS4/PEEK tube fabrication | |
|---|---|
| AFP Processing parameters | AS4/PEEK |
| Torch temperature | 920° C. |
| Torch nip to roller distance | 11 mm |
| Nitrogen flow rate | 70 SMPL |
| Layup speed | 50 mm/sec |
| Compaction force | 40 kg |

The flameholder and the internal diameter of the Carbon-PEEK tube were machined on a computer numerical control (CNC) lathe at low speed with coolant. Finally, the tube was cut to length with an abrasive wheel. The polyimide insulator, the hub and the center puck were machined with a CNC milling machine.

The central aluminum puck was inserted in the polyimide insulator and glued in place with Eccobond adhesive and cured in an oven at 100° C. for 9 hours. This assembly was then glued in the hub using the same technique. Electrodes were screwed in the assembly and secured with Loctite® Threadlocker Red 271™. The assembly was cured at 120° C. for 9 hours. Finally, the engine was cooled in liquid Nitrogen for 5 minutes then introduced in the carbon fiber rim-rotor using minimal pressure.

Prototype

Figure 25:
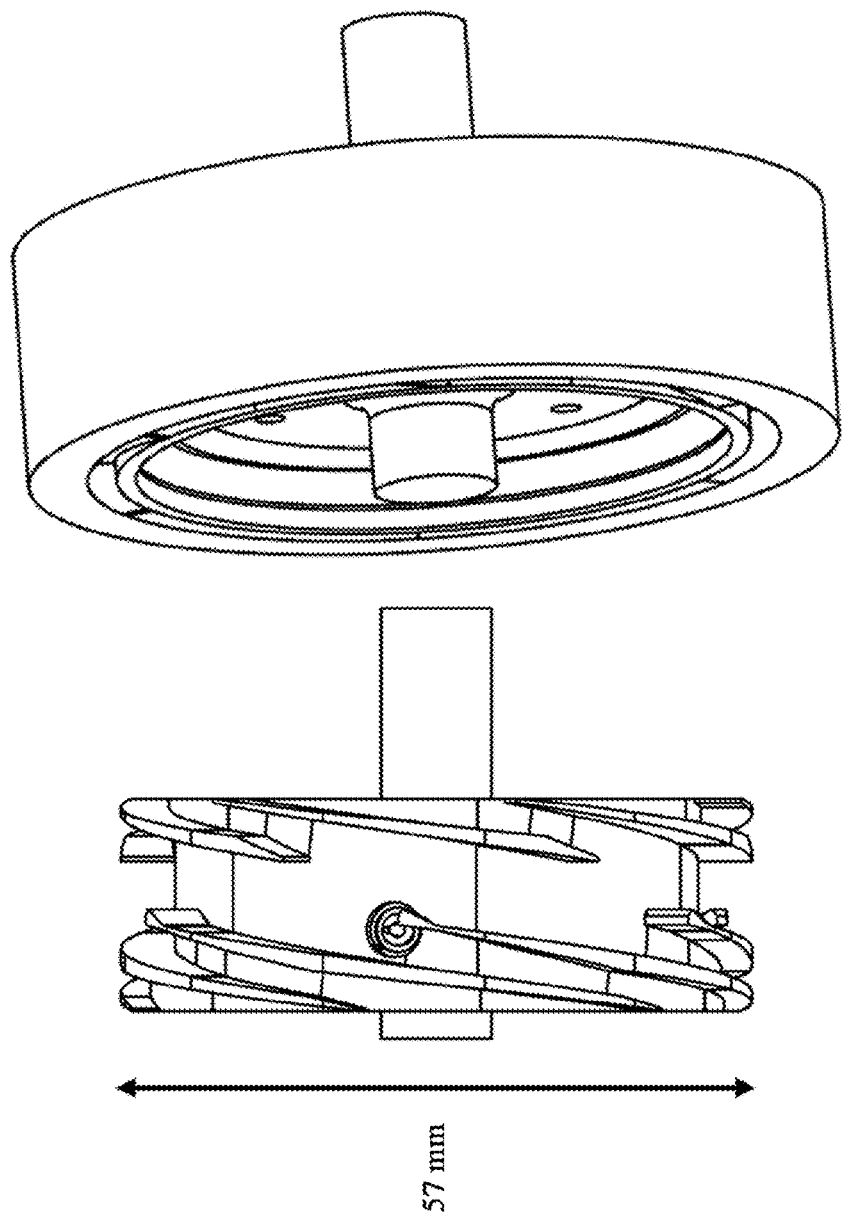
FIG. 25 shows internal components of the prototype R4A of FIG. 19.

The prototype comprises CNC machined ramjets in an aluminum hub, wrapped in a carbon-PEEK rim-rotor containing the flameholder, as shown in FIG. 25. A spark ignition system is used to ignite the premixed air-hydrogen flow in the single combustion chamber.

Figure 26:
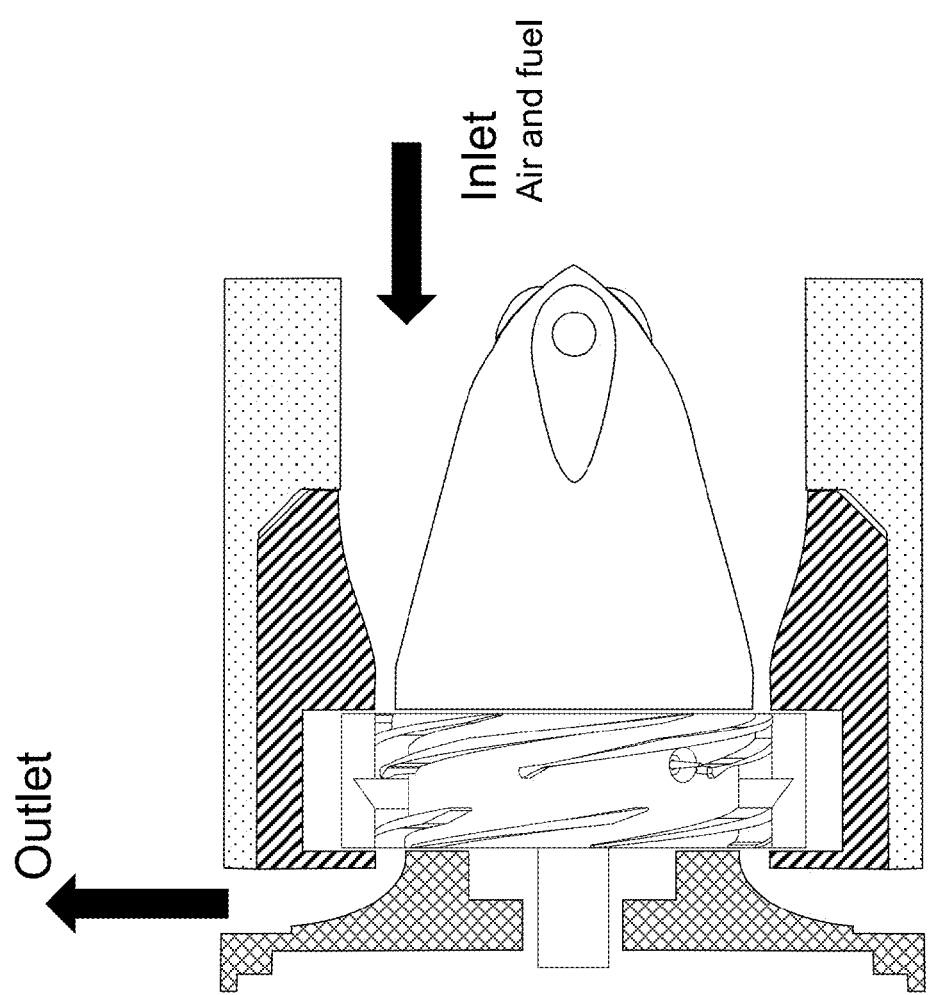
FIG. 26 shows a cross-section of a test bench fluid module.

FIG. 25 shows internal components of the prototype R4A of FIG. 19. FIG. 26 shows a cross-section of the test bench fluid module.

The tested prototype is accelerated by a Garrett GT-15 automotive turbocharger up to 200,000 RPM. A machined aluminum manifold directs the flow into the rotating ramjets (FIG. 26). A series of sensors monitor the main flow properties before and after the engine: (1) mass flow using an automotive hot-wire, (2) static pressures of the inlet and outlet with 1.5 mm (1/16''') O.D. tube flush-mounted to the wall, (3) temperatures at inlet and outlet with small thermocouples, (4) outlet tangential velocity with a pilot tube facing parallel to the tangential direction.

CONCLUSION

Those of ordinary skill in the art will realize that the above description of the combustion systems and of their components are illustrative only and are not intended to be in any way limiting. Other embodiments will readily suggest themselves to such persons with ordinary skill in the art having the benefit of the present disclosure. Furthermore, the disclosed combustion systems and components may be customized to offer valuable solutions to existing needs and problems related to the design of ramjet engines.

In the interest of clarity, not all of the routine features of the implementations of the combustion systems and of their components are shown and described. It will, of course, be appreciated that in the development of any such actual implementation of the combustion systems and of their components, numerous implementation-specific decisions may need to be made in order to achieve the developer's specific goals, such as compliance with application-related and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of ramjet engines having the benefit of the present disclosure.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A rotating combustion system, comprising: a rim-rotor positioned around and adjacent to a rotating combustion chamber;
   an injection system for providing a fuel mixture creating an air and fuel mixture to the combustion chamber;
   an ignition system for igniting the air and fuel mixture; and
   a flameholding system positioned for communication with the rotating combustion chamber and adapted to force an ignited flow of the air and fuel mixture toward a center of rotation within the rotating combustion system wherein the flameholding system comprises an at least one flameholder including a first flameholder positioned at the top of the rotating combustion chamber, a second flameholder vertically configured from the bottom to the top of the rotating combustion chamber, and a third flameholder positioned at the bottom of the rotating combustion chamber.

2. The rotating combustion system of claim 1, wherein the rotating combustion chamber comprises curved outlet blades adapted for use at supersonic outlet speeds.

3. The rotating combustion system of claim 1, wherein the flameholding system is adapted for high centrifugal force gravity field (g-field) combustion.

4. The rotating combustion system of claim 1, wherein the ignition system ignites the air and fuel mixture before admission to the rotating combustion chamber.

5. A rotating combustion system, comprising: a rim-rotor positioned around and adjacent to a rotating combustion chamber;
   an injection system for providing a fuel mixture creating an air and fuel mixture to the combustion chamber;
   an ignition system for igniting the air and fuel mixture; and
   a flameholding system positioned for communication with the rotating combustion chamber and adapted to force an ignited flow of the air and fuel mixture toward a center of rotation within the rotating combustion system wherein the flameholding system is positioned on an inlet blade of the rotating combustion chamber.

6. The rotating combustion system of claim 5, wherein the flameholding system comprises a flameholder positioned on each of a plurality of inlet blades of the rotating combustion chamber.

7. The rotating combustion system of claim 5, wherein the rotating combustion chamber comprises curved outlet blades adapted for use at supersonic outlet speeds.

8. The rotating combustion system of claim 5, wherein the flameholding system is adapted for high centrifugal force gravity field (g-field) combustion.

9. The rotating combustion system of claim 5, wherein the ignition system ignites the air and fuel mixture before admission to the rotating combustion chamber.

10. The rotating combustion system according to claim 5 further comprising a compression and an expansion within a complete thermodynamic cycle in a single rotating assembly operable as a rim-rotor engine.

11. The rotating combustion system according to claim 10, wherein the rim-rotor engine has the air downstream of the compression and upstream of the rotating combustion chamber at subsonic speeds.

12. The rotating combustion system according to claim 11, wherein the rim-rotor engine has the air upstream of the compression at supersonic speeds and whereby the compression creates shockwaves to decelerate the air to subsonic speeds upstream of the rotating combustion chamber at subsonic speeds.

13. The rotary ramjet engine of claim 12, wherein the blades are further curved at their extremities to align with the rotation axis of the engine, extending perpendicularly from the rotation axis.

14. A rotating combustion system, comprising: a rim-rotor positioned around and adjacent to a rotating combustion chamber;
   an infection system for providing a fuel mixture creating an air and fuel mixture to the combustion chamber;
   an ignition system for igniting the air and fuel mixture; and
   a flameholding system positioned for communication with the rotating combustion chamber and adapted to force an ignited flow of the air and fuel mixture toward a center of rotation within the rotating combustion system, wherein the injection system further comprises an outer radius injector for delivering fuel near an external perimeter of the rotating combustion chamber; and
   an inner radius injector for delivering fuel near an internal perimeter of the rotating combustion chamber;
   wherein the outer radius injector is adapted to deliver fuel during engine startup if the fuel is heavier than air and to deliver fuel after engine startup if the fuel is lighter than air; and
   the inner radius injector is adapted to deliver fuel during engine startup if the fuel is lighter than air and to deliver fuel after engine startup if the fuel is heavier than air.

15. The rotating combustion system according to claim 14, wherein a high centrifugal force gravity field (g-field) maximizes air and fuel mixing after engine startup due to buoyancy effect.

16. The rotating combustion system according to claim 14 wherein a high centrifugal force gravity field (g-field) minimizes air and fuel mixing during engine startup due to buoyancy effect.

* * * * *